United States Patent
Ono et al.

(10) Patent No.: US 6,409,810 B1
(45) Date of Patent: *Jun. 25, 2002

(54) WATER-SOLUBLE TRISAZO COMPOUNDS, AQUEOUS INK COMPOSITION AND COLORED ARTICLE

(75) Inventors: Hiroaki Ono; Takashi Miyazawa, both of Tokyo; Toru Tabei, Kitamoto; Yasuo Shirasaki, Omiya; Isao Yamaguchi, Nagareyama; Kazunobu Nagasaki, Kawaguchi, all of (JP)

(73) Assignee: Nippon Kayaku Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,464
(22) PCT Filed: Apr. 23, 1998
(86) PCT No.: PCT/JP98/01877
§ 371 (c)(1),
(2), (4) Date: Nov. 22, 1999
(87) PCT Pub. No.: WO98/47970
PCT Pub. Date: Oct. 29, 1998

(30) Foreign Application Priority Data

Apr. 24, 1997 (JP) .............................................. 9-120121

(51) Int. Cl.⁷ ......................... C09D 11/02; C09B 31/16
(52) U.S. Cl. .................... 106/31.13; 438/195; 534/676; 534/678; 534/679; 534/680; 534/681; 534/810
(58) Field of Search ................................ 534/676, 678, 534/679, 680, 681, 810; 106/31.13; 428/195

(56) References Cited

U.S. PATENT DOCUMENTS 5,213,614 A 5/1993 Eida et al. ................. 106/22 K
5,215,578 A 6/1993 Eida et al. ................. 106/22 K

FOREIGN PATENT DOCUMENTS

| EP | 0 446 620 | 9/1991 |
| JP | 62-25771 | 11/1987 |
| JP | 6-73320 | 3/1994 |
| NL | 64 232 | 10/1949 |

OTHER PUBLICATIONS

Patent Abstracts of Japan vol. 005, No. 016; Jan. 30, 1981 & JP 55 144067 Nov. 10, 1980 Abstract.

The Society of Dyers and Colorists: Colour Index, vol. 4, 9 May 1972 XP 02146105 p. 4297; direct dye of No.:C.I. 31655.

Copy of the Search Report dated Sep. 7, 2000.

*Primary Examiner*—Cynthia H. Kelly
*Assistant Examiner*—Ling Xu
(74) *Attorney, Agent, or Firm*—Nields & Lemack

(57) ABSTRACT

A black recording having high solubility, being stable even after being stored for long, and capable of forming a printed image with a high optical density and excellent water and light resistances. The recording fluid contains a trisazo compound of general formula (1): wherein D is an 8-hydroxy-1-naphtyl group substituted with one or two sulfo groups; A is a 1,4-phenylene group or 1,4-naphtylene group which may be substituted with amino, hydroxy, alkyl, alkoxy, acylamino or ureido; and B is a phenyl group which may be substituted with hydroxy, amino or sulfo, or a salt thereof and is used for the recording.

(1)

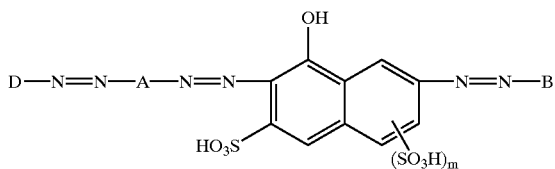

9 Claims, No Drawings

WATER-SOLUBLE TRISAZO COMPOUNDS, AQUEOUS INK COMPOSITION AND COLORED ARTICLE

FIELD OF THE INVENTION

The present invention relates to new water-soluble trisazo compounds and colored articles therefrom.

PRIOR ARTS

Among various color recording methods, one typical method is the recording method by means of ink jet printers wherein ink droplets are produced and deposit on various materials to be recorded such as papers, films and fabrics so that recordings are effected. This method has advantages that it is silent since materials to be recorded are not contacted with a recording head and that miniaturization, speeding up and color printing can be easily achieved. Thus, it has recently come into wide use and it is expected to greatly spread in future.

As inks for pens, felt-tip pens and the like as well as inks for ink jet printers, aqueous inks comprising water-soluble dyes dissolved in aqueous media are used. Generally, the aqueous inks comprise water-soluble organic solvents in order to prevent the inks from clogging in nibs and ink delivery nozzles. These inks should meet the requirements that they can form images having a high optical density, that they do not clog nibs and ink delivery nozzles, that they are easily dried on materials to be recorded, that they hardly blot and that they have excellent storage stability. In addition, images therefrom should have sufficient light and water resistances.

Various inks having different hues are prepared from various dyes. Among the inks, black inks are important since they are used in mono-color and full-color images. As dyes for black inks, many dyes have been proposed as described in prior patent applications, for example, JP-55144067A (1980), JP-57207660A(1982), JP-58147470(1983), JP-59093766A(1984), JP-62190269A(1987), JP-62246975A(1987), JP-63022867A(1988), JP-63033484A(1988), JP-01093389A(1989), JP-02140270A(1990), JP-03167270A(1991), JP-03200852A(1991), JP-04359065A(1992), JP-06172668A(1994), JP-06248212A(1994), JP-07026160A(1995), JP-07268256A(1995) and the like. However, the prior dyes cannot satisfy the commercial requirements as described above.

BACKGROUND OF THE INVENTION

An object of the present invention is to provide a black recording fluid having a high solubility, stable even after a long storage, capable of forming a printed image with a high optical density and excellent in water and light resistances.

SUMMARY OF THE INVENTION

The present inventors have earnestly investigated in order to solve the aforementioned problem, achieving the present invention.

Accordingly, the present invention relates to:
(1) a trisazo compound represented by the following general formula (1):

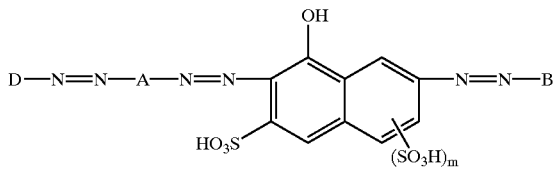

(1)

wherein
D is an 8-hydroxy-1-naphthyl group substituted with one or two sulfo groups;
A is a group of the general formula (2) or (3):

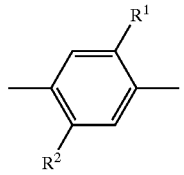

(2)

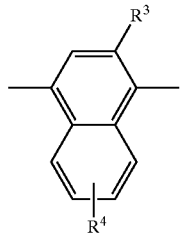

(3)

wherein $R^1$ and $R^2$ are each independently hydrogen, amino, hydroxyl, carboxyl, sulfo, phosphono, (C1–C4)alkoxycarbonyl, (C1–C4)alkyl optionally substituted with hydroxy or (C1–C4)alkoxy, (C1–C4)alkoxy optionally substituted with hydroxy or (C1–C4)alkoxy, (C2–C4) alkanoylamino optionally substituted with hydroxy or (C1–C4)alkoxy or ureido, $R^3$ is hydrogen, (C1–C4)alkyl or (C1–C4)alkoxy, and $R^4$ is hydrogen, sulfo or phosphono;
B is a group represented by the general formula (4):

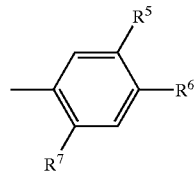

(4)

wherein $R^5$, $R^6$ and $R^7$ are each independently hydrogen, hydroxyl, amino, carboxyl, (C1–C4) alkoxy, (C1–C4)alkoxycarbonyl, (C1–C4)alkyl, mono- or bis-carboxy-(C1–C3)alkylamino, carboxy-(C1–C3)alkoxy, (C1–C4)alkylamino optionally substituted with hydroxy or (C1–C4) alkoxy, (C1–C4)alkanoylamino, sulfo, halogen or ureido; and
m is 0 or 1,
or its salt;
(2) a salt of a trisazo compound as defined in (1) wherein the salt is a lithium salt, a sodium salt, or an ammonium salt represented by the general formula (5):

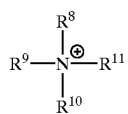

(5)

wherein $R^8$ to $R^{11}$ are each independently hydrogen, (C1–C4)alkyl, hydroxy-(C1–C4)alkyl or hydroxyethoxy-(C1–C4)alkyl group;

(3) a trisazo compound or its salt as defined in (1) or (2) wherein D is
8-hydroxy-3,6-disulfo-1-naphthyl,
8-hydroxy-4,6-disulfo-1-naphthyl,
8-hydroxy-2,4-disulfo-1-naphthyl,
8-hydroxy-3,5-disulfo-1-naphthyl,
8-hydroxy-4,7-disulfo-1-naphthyl,
8-hydroxy-5,7-disulfo-1-naphthyl,
8-hydroxy-4-sulfo-1-naphthyl,
8-hydroxy-5-sulfo-1-naphthyl, or
8-hydroxy-6-sulfo-1-naphthyl;

(4) a trisazo compound or its salt as defined in any one of (1) to (3) wherein A is the group of the general formula (2) wherein $R^1$ and $R^2$ are each independently hydrogen, methyl, ethyl, methoxy, ethoxy, methoxyethoxy, amino, hydroxyl, carboxyl, sulfo, acetylamino, n-propionylamino or ureido, or the general formula (3) wherein $R^3$ is hydrogen, methyl or methoxy and $R^4$ is hydrogen or sulfo;

(5) a trisazo compound or its salt as defined in any one of (1) to (4) wherein A is the group of the general formula (2) wherein $R^1$ is methyl, methoxy or methoxyethoxy and $R^2$ is hydrogen, methyl, methoxy, amino, hydroxyl, acetylamino or ureido;

(6) a trisazo compound or its salt as defined in any one of (1) to (4) wherein A is the group of the general formula (3) wherein $R^3$ is hydrogen or methoxy and $R^4$ is hydrogen or sulfo;

(7) a trisazo compound or its salt as defined in any one of (1) to (6) wherein B is the group of the general formula (4) wherein $R^5$ is hydrogen, methyl, methoxy, chlorine, carboxyl or sulfo, and $R^6$ and $R^7$ are each independently hydroxyl, amino, carboxymethylamino, carboxymethoxy, acetylamino or ureido;

(8) a trisazo compound or its salt as defined in any one of (1) to (7) wherein m is zero;

(9) an aqueous ink composition containing a trisazo compound or its salt as defined in any one of (1) to (8);

(10) an article colored with a trisazo compound as defined in any one of (1) to (8) or an aqueous ink composition as defined in (9); and

(11) a colored article as defined in (10) wherein coloring is effected by means of a printer.

DETAILED DESCRIPTION OF THE INVENTION

The present invention will be fully explained below.

In the compound represented by the aforementioned formula (1), D is an 8-hydroxy-1-naphthyl group substituted with one or two sulfo groups. Preferably, it includes 8-hydroxy-3,6-disulfo-1-naphthyl, 8-hydroxy-4,6-disulfo-1-naphthyl, 8-hydroxy-2,4-disulfo-1-naphthyl, 8-hydroxy-3,5-disulfo-1-naphthyl, 8-hydroxy-4,7-disulfo-1-naphthyl, 8-hydroxy-5,7-disulfo-1-naphthyl, 8-hydroxy-4-sulfo-1-naphthyl, 8-hydroxy-5-sulfo-1-naphthyl, 8-hydroxy-6-sulfo-1-naphthyl and the like. 8-Hydroxy-3,6-disulfo-1-naphthyl, 8-hydroxy-4,6-disulfo-1-naphthyl, 8-hydroxy-2,4-disulfo-1-naphthyl, 8-hydroxy-4-sulfo-1-naphthyl or the like is more preferable.

In A and B in the aforementioned formula (1), examples of (C1–C4)alkyl include methyl, ethyl, n-propyl, isopropyl, n-butyl, isobutyl, sec-butyl, tert-butyl or the like, preferably methyl or ethyl. Examples of (C1–C4) alkyl group substituted with hydroxy or (C1–C4)alkoxy include 2-hydroxyethyl, 2-hydroxypropyl, 1-hydroxy-1-methylethyl, methoxyethyl, ethoxyethyl or the like, preferably 2-hydroxyethyl or methoxyethyl. Examples of (C1–C4) alkoxy group optionally substituted with hydroxy or (C1–C4)alkoxy include methoxy, ethoxy, n-propoxy, isopropoxy, n-butoxy, sec-butoxy, tert-butoxy, 2-hydroxyethoxy, 2- or 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, 2-hydroxyethoxyethoxy or the like, preferably methoxy, ethoxy, methoxyethoxy or ethoxyethoxy. Methoxy or methoxyethoxy is particularly preferable. Examples of (C1–C4) alkylamino group optionally substituted with hydroxy or (C1–C4)alkoxy include 2-hydroxyethylamino, 2-hydroxyethylmethylamino, N,N-di(2-hydroxyethyl)amino, 2-hydroxypropylamino, 3-hydroxypropylamino, methoxyethylamino, ethoxyethylamino or the like, preferably 2-hydroxyethylamino, methoxyethylamino or 3-hydroxypropylamino. (C1–C4)alkanoylamino group optionally substituted with hydroxy or (C1–C4)alkoxy include acetylamino, n-propionylamino, isopropionylamino, hydroxyacetylamino, 2- or 3-hydroxy-n-propionylamino, 2- or 3-methoxy-n-propionylamino, butyrylamino or the like, among which acetylamino is particularly preferable. Examples of mono- or bis-carboxy-(C1–C3)alkylamino group include carboxymethylamino, carboxyethylamino, carboxypropylamino, bis-carboxymethylamino, bis-carboxyethylamino, bis-carboxypropylamino, preferably carboxymethylamino, bis-carboxymethylamino or carboxyethylamino. Examples of carboxy-(C1–C3)alkoxy include carboxymethoxy, carboxyethoxy and carboxypropoxy, particularly preferably carboxymethoxy.

Preferably, $R^1$ and $R^2$ are each independently hydrogen, methyl, ethyl, methoxy, ethoxy, methoxyethoxy, ethoxyethoxy, amino, hydroxyl, carboxyl, sulfo, phosphono, acetylamino, n-propionylamino and ureido. Hydrogen, methyl, methoxy, methoxyethoxy, amino, hydroxyl, carboxyl, acetylamino or ureido is particularly preferable.

The general formula (2) is preferably derived from each of the following intermediates: 1-Amino-2-methoxy-5-methylbenzene, 1-amino-2,5-dimethylbenzene, 1-amino-2-methoxy-5-acetylaminobenzene, 1-amino-2-methoxyethoxy-5-acetylaminobenzene, 1-amino-2-methoxybenzene, 1-amino-2-methylbenzene, 1-amino-2,5-dimethoxybenzene, 1-amino-2-methyl-5-acetylaminobenzene, 1-amino-2-methoxy-5-ureidobenzene, 1-amino-2-methyl-5-ureidobenzene, 1-amino-3-methoxybenzene, 1-amino-3-methylbenzene, 1-amino-2-(2'-hydroxyethoxy)-5-methylbenzene, 3-aminobenzoic acid, 3-amino-4-methylbenzoic acid, 3-amino-4-methoxybenzoic acid, 2,4-diaminobenzoic acid, 2,4-diaminobenzenesulfonic acid, 2-amino-4-acetylaminobenzenesulfonic acid, 3-aminobenzenephosphonic acid, 4-methoxy-3-aminophenol and 2,4-diaminoanisole.

$R^3$ is preferably hydrogen, methyl, ethyl, methoxy or ethoxy. Particularly, hydrogen, methyl or methoxy is preferable.

$R^4$ is preferably sulfo.

It is particularly preferable that the residue A of the general formula (3) is derived from the intermediate 1-aminonaphthalene-2-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-8-sulfonic acid or 1-amino-2-methoxynaphthalene-6-sulfonic acid.

A component from which the naphthalene residue in the general formula (1) is derived is 1-hydroxy-3-sulfo-7-aminonaphthalene (γ acid) when m is 0 and 1-hydroxy-3,6-disulfo-7-aminonaphthalene (2R acid) when m is 1.

$R^5$ is hydrogen, methyl, methoxy, chlorine, carboxyl, sulfo or the like. Methyl, ethyl, methoxy, ethoxy or sulfo is preferable. Particularly, hydrogen or sulfo is preferable.

$R^6$ and $R^7$ are each independently hydroxyl, amino, carboxymethylamino, carboxypropylamino, bis-carboxymethylamino, acetylamino, ureido or the like. Hydroxyl, amino, acetylamino or carboxymethylamino are particularly preferable.

Examples of intermediate from which the residue B of the general formula (4) is derived include 1,3-phenylenediamine, resorcin, 3-aminophenol, 2-amino-4-acetylaminobenzesulfonic acid, 2,4-diaminobenzenesulfonic acid, 2,4-diaminobenzoic acid, 2,4-diaminotoluene, 2,4-diaminoanisole, 2,4-diaminochlorobenzene, 1,3-bis-carboxymethylaminobenzene, 1-amino-3-acetylaminobenzene, 1-amino-2-methoxy-5-acetylaminobenzene, 1-amino-2-methyl-5-acetylaminobenzene, 1-amino-2-methoxy-5-ureidobenzene, 2,4-dihydroxybenzoic acid, 1-amino-2-methyl-5-ureidobenzene or the like. 1,3-Phenylenediamine, resorcin, 3-aminophenol or 2,4-diaminobenzenesulfonic acid is preferable. Their mixture may be used.

Salts are those of inorganic or organic cations. Suitable inorganic salts are alkali metal or alkaline earth metal salts. Preferable inorganic salt are lithium or sodium salt. And, suitable organic salts are ammonium salts represented by the general formula (5).

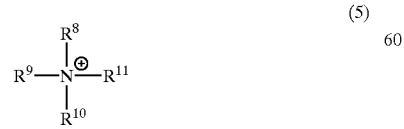

(5)

In the above general formula (5), $R^8$ to $R^{11}$ are each independently hydrogen, (C1–C4)alkyl, hydroxy-(C1–C4) alkyl or hydroxyethoxy-(C1–C4)alkyl. Examples of (C1–C4) alkyl include methyl, ethyl, n-propyl, i-propyl, n-butyl, i-butyl, sec-butyl, tert-butyl or the like, Examples of hydroxy-(C1–C4)alkyl include hydroxymethyl, hydroxyethyl, 3-hydroxypropyl, 2-hydroxypropyl, 4-hydroxybutyl, 3-hydroxybutyl, 2-hydroxybutyl or the like. Examples of hydroxyethoxy-(C1–C4)alkyl include hydroxyethoxymethyl, 2-hydroxyethoxyethyl, 3-hydroxyethoxypropyl, 2-hydroxyethyoxypropyl, 4-hydroxyethoxybutyl, 3-hydroxyethoxybutyl, 2-hydroxyethoxybutyl or the like.

Examples of the compound of the general formula (5) are shown in Table 1.

TABLE 1

|      | $R^8$ | $R^9$ | $R^{10}$ | $R^{11}$ |
|------|-------|-------|----------|----------|
| 5-1  | H     | —$C_2H_4$OH | —$C_2H_4$OH | —$C_2H_4$OH |
| 5-2  | $CH_3$ | —$C_2H_4$OH | —$C_2H_4$OH | —$C_2H_4$OH |
| 5-3  | H     | —$CH_2CH(OH)CH_3$ | —$CH_2CH(OH)CH_3$ | —$CH_2CH(OH)CH_3$ |
| 5-4  | $CH_3$ | —$CH_2CH(OH)CH_3$ | —$CH_2CH(OH)CH_3$ | —$CH_2CH(OH)CH_3$ |
| 5-5  | H     | —$C_2H_4$OH | H | —$C_2H_4$OH |
| 5-6  | $CH_3$ | —$C_2H_4$OH | H | —$C_2H_4$OH |
| 5-7  | H     | —$CH_2CH(OH)CH_3$ | H | —$CH_2CH(OH)CH_3$ |
| 5-8  | $CH_3$ | —$CH_2CH(OH)CH_3$ | H | —$CH_2CH(OH)CH_3$ |
| 5-9  | $CH_3$ | —$C_2H_4$OH | $CH_3$ | —$C_2H_4$OH |
| 5-10 | $CH_3$ | —$CH_2CH(OH)CH_3$ | $CH_3$ | —$CH_2CH(OH)CH_3$ |

Examples of the trisazo compound represented by the general formula (1) are illustrated in the general formula (1-1) (Table 2) to the general formula (1–5) (Table 27).

(1-1)

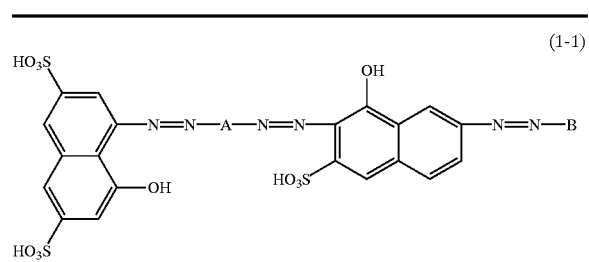

general formula (1-1)

| Compound No. | A | B |
|---|---|---|
| 0001 | | |
| 0002 | " | |

-continued (1-1)

[Structure: HO₃S and HO₃S substituted naphthalene with OH, connected via N=N-A-N=N to naphthalene (OH, HO₃S) then N=N-B]

general formula (1-1)

| Compound No. | A | B |
|---|---|---|
| 0003 | " | 1,3-dihydroxybenzene (resorcinol) with OH at positions |
| 0004 | " | benzene with COOH, OH, OH (2,4-dihydroxybenzoic acid) |
| 0005 | " | benzene with SO₃H, NH₂, NH₂ |
| 0006 | " | benzene with SO₃H, NH₂, NH₂ + benzene with NH₂, OH |
| 0007 | " | benzene with NHCH₂COOH, NHCH₂COOH |
| 0008 | " | benzene with COOH, NH₂, NH₂ |
| 0009 | " | benzene with NHCH₂COOH, NHCOCH₃ |

-continued (1-1)

[Structure: HO₃S substituted naphthalene with OH, OH, HO₃S, connected via N=N-A-N=N to naphthalene (OH, HO₃S) then N=N-B]

general formula (1-1)

| Compound No. | A | B |
|---|---|---|
| 0010 | 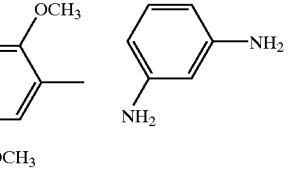 benzene with OCH₃, two CH₃, NHCOCH₃ | benzene with NH₂, NH₂ |
| 0011 | " | benzene with NH₂, OH |
| 0012 | " | benzene with OH, OH |
| 0013 | " | benzene with COOH, OH, OH |
| 0014 | " | benzene with SO₃H, NH₂, NH₂ |
| 0015 | " | benzene with NHCH₂COOH, NHCH₂COOH |
| 0016 | 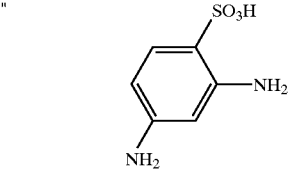 benzene with OCH₃, two CH₃, NHCOCH₃ | benzene with COOH, NH₂, NH₂ |

-continued
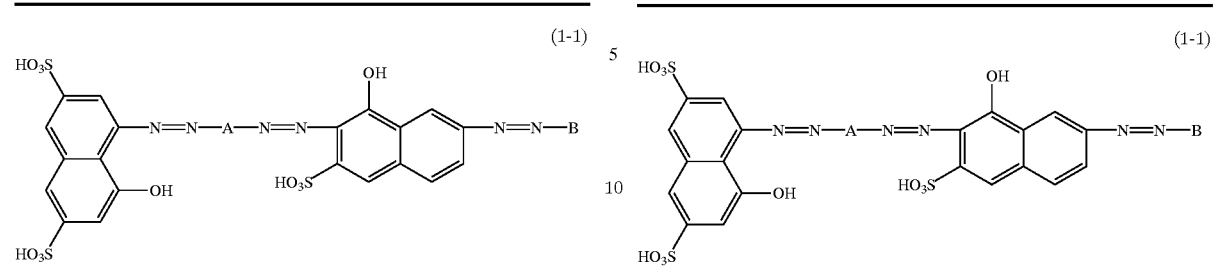
general formula (1-1)
| Compound No. | A | B |
|---|---|---|
| 0017 | " |  |
| 0018 | " | 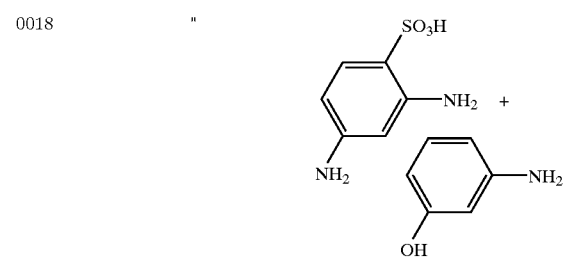 |
| 0019 | 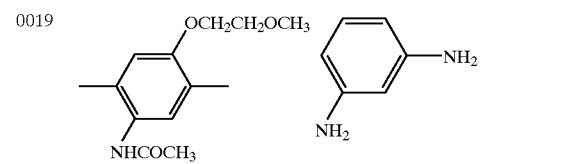 | 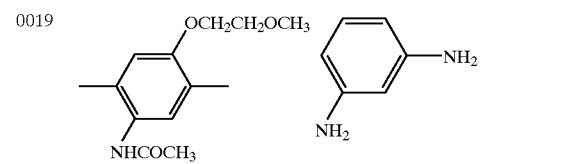 |
| 0020 | " | 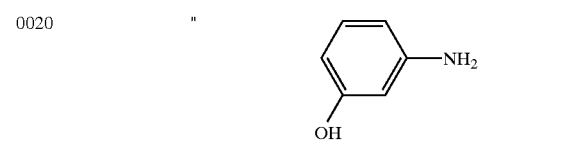 |
| 0021 | " | 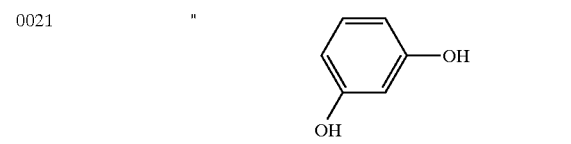 |
| 0022 | " | 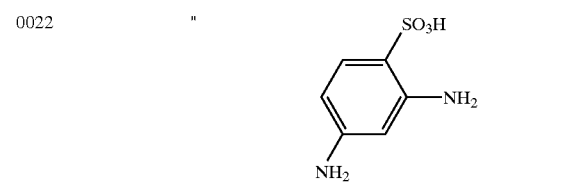 |
-continued
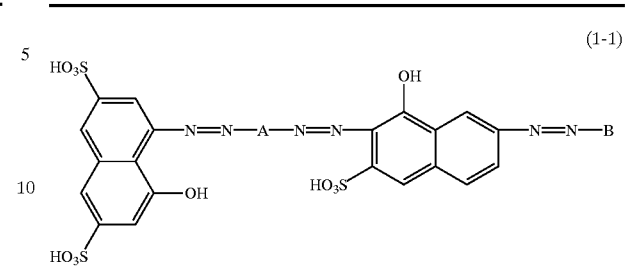
general formula (1-1)
| Compound No. | A | B |
|---|---|---|
| 0023 | 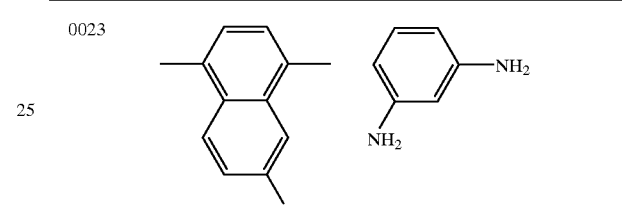 | 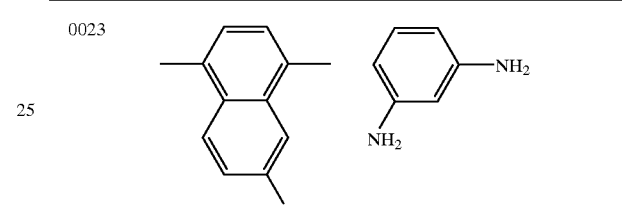 |
| 0024 | " | 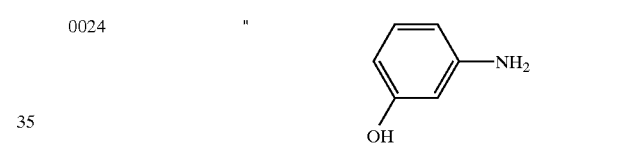 |
| 0025 | " | 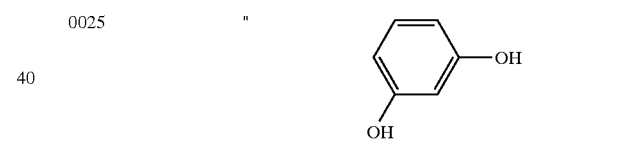 |
| 0026 | " | 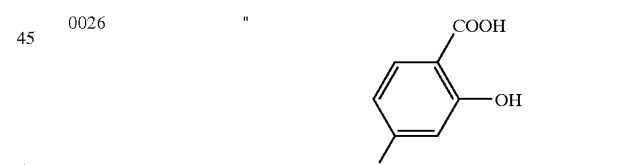 |
| 0027 | " | 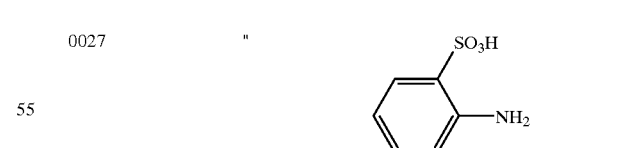 |
| 0028 | " | 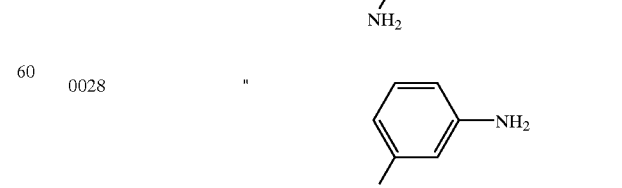 |

-continued

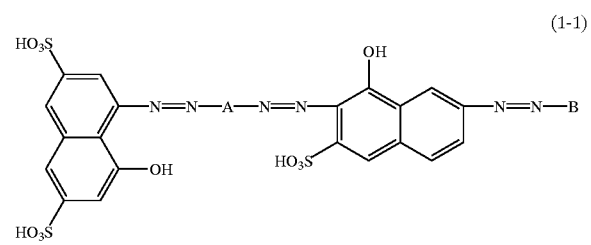

(1-1)

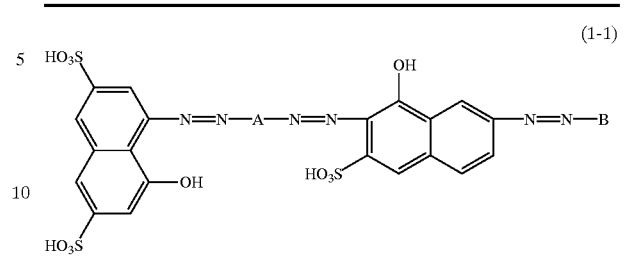

(1-1)

general formula (1-1)

| Compound No. | A | B |
|---|---|---|
| 0029 | " | 2-amino-4-amino-benzenesulfonic acid + 3-aminophenol (SO₃H, NH₂, NH₂ / NH₂, OH) |
| 0030 | 1,5-dimethyl-naphthalene-7-sulfonic acid | 3-aminoaniline (NH₂, NH₂) |
| 0031 | " | 3-aminophenol (NH₂, OH) |
| 0032 | " | resorcinol (OH, OH) |
| 0033 | " | 2-amino-4-amino-benzenesulfonic acid (SO₃H, NH₂, NH₂) |
| 0034 | 2-methoxy-1,5-dimethyl-naphthalene-7-sulfonic acid (OCH₃, SO₃H) | 3-aminoaniline (NH₂, NH₂) | general formula (1-1)

| Compound No. | A | B |
|---|---|---|
| 0035 | " | 3-aminophenol (NH₂, OH) |
| 0036 | " | resorcinol (OH, OH) |
| 0037 | " | 2-amino-4-amino-benzenesulfonic acid (SO₃H, NH₂, NH₂) |
| 0038 | 1,5-dimethylnaphthalene | 3-aminoaniline (NH₂, NH₂) |
| 0039 | " | 3-aminophenol (NH₂, OH) |
| 0040 | " | resorcinol (OH, OH) |
| 0041 | " | 2-amino-4-amino-benzenesulfonic acid (SO₃H, NH₂, NH₂) |

-continued general formula (1-1)

| Compound No. | A | B |
|---|---|---|
| 0042 | 2,5-dimethyl-phenyl with NHCONH₂ | 3-aminophenol (NH₂, OH) |
| 0043 | " | resorcinol (OH, OH) |
| 0044 | " | benzene with SO₃H, NH₂, NH₂ |
| 0045 | dimethyl-phenyl with OCH₃ and NH₂ | 1,3-phenylenediamine (NH₂, NH₂) |
| 0046 | " | aminophenol (NH₂, OH) |
| 0047 | " | resorcinol (OH, OH) |
| 0048 | " | benzene with SO₃H, NH₂, NH₂ |
| 0049 | " | benzene with NHCH₂COOH, NHCH₂COOH |
| 0050 | " | benzene with NH₂, OCH₂COOH |
| 0051 | dimethyl-phenyl with OCH₂CH₂OCH₃ and NH₂ | benzene with SO₃H, NH₂, NH₂ |
| 0052 | dimethyl-phenyl with OCH₃, OCH₃ | benzene with SO₃H, NH₂, NH₂ |
| 0053 | " | benzene with NH₂, OCH₂COOH |
| 0054 | " | resorcinol (OH, OH) |
| 0055 | " | benzene with COOH, OH, OH |

-continued
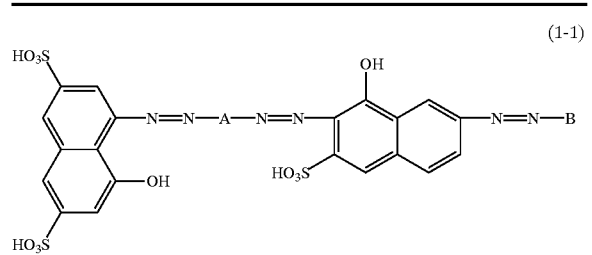
general formula (1-1)
| Compound No. | A | B |
|---|---|---|
| 0056 | 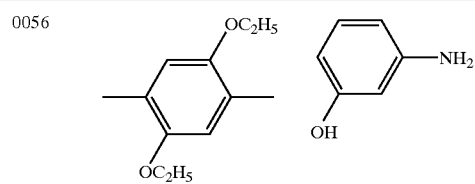 | |
| 0057 | " |  |
| 0058 | 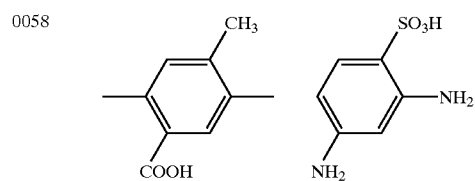 | |
| 0059 | " |  |
| 0060 | 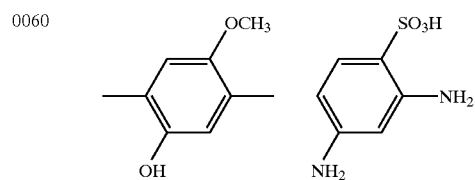 | |
| 0061 | " |  |
| 0062 | " |  |
-continued
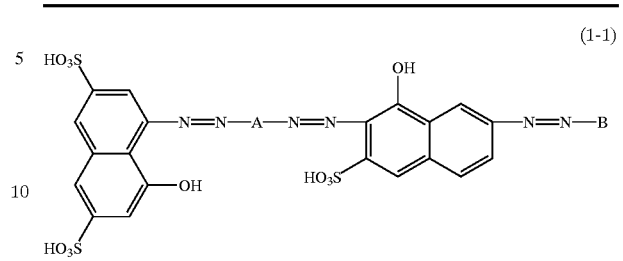
general formula (1-1)
| Compound No. | A | B |
|---|---|---|
| 0063 | " | 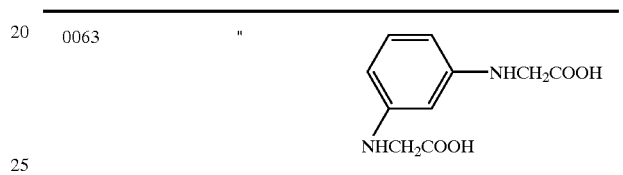 |
| 0064 |  | |
| 0065 | " |  |
| 0066 | " |  |
| 0067 |  | |
| 0068 | " |  |
| 0069 | " |  |

-continued

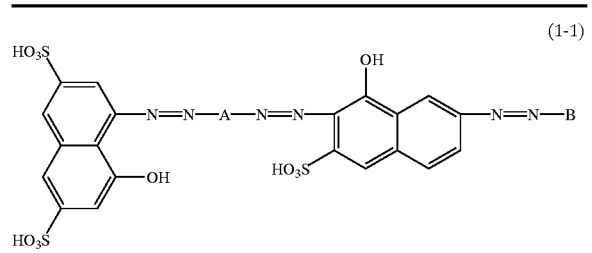

(1-1)

general formula (1-1)

| Compound No. | A | B |
|---|---|---|
| 0070 | 4-amino-2,5-dimethyl-phenoxyethanol | benzene-1,3-diamine |
| 0071 | " | 3-aminophenol |
| 0072 | 2-(2,5-dimethyl-4-methylphenoxy)ethanol | 2,4-diaminobenzenesulfonic acid |
| 0073 | " | 3-aminophenol |
| 0074 | (2,5-dimethylphenyl)phosphonic acid | 2,4-diaminobenzoic acid |
| 0075 | " | 3-aminophenol |
| 0076 | N-(4-ethoxy-2,5-dimethylphenyl)propanamide | 2,4-diaminobenzenesulfonic acid |

-continued

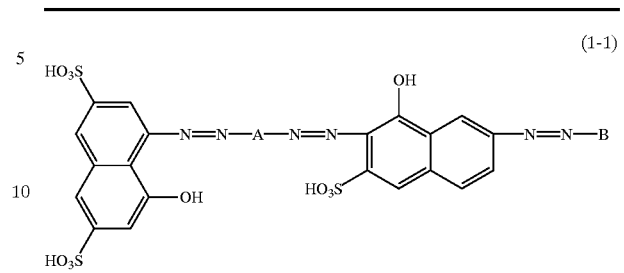

(1-1)

general formula (1-1)

| Compound No. | A | B |
|---|---|---|
| 0077 | " | 3-aminophenol |
| 0078 | N-(4-methoxy-2,5-dimethylphenyl)propanamide | 2,4-diaminobenzenesulfonic acid |
| 0079 | " | 3-aminophenol |
| 0080 | 4,8-dimethyl-1-naphthalenesulfonic acid | benzene-1,3-diol |
| 0081 | 4,8-dimethyl-1-naphthalenesulfonic acid | benzene-1,3-diamine |

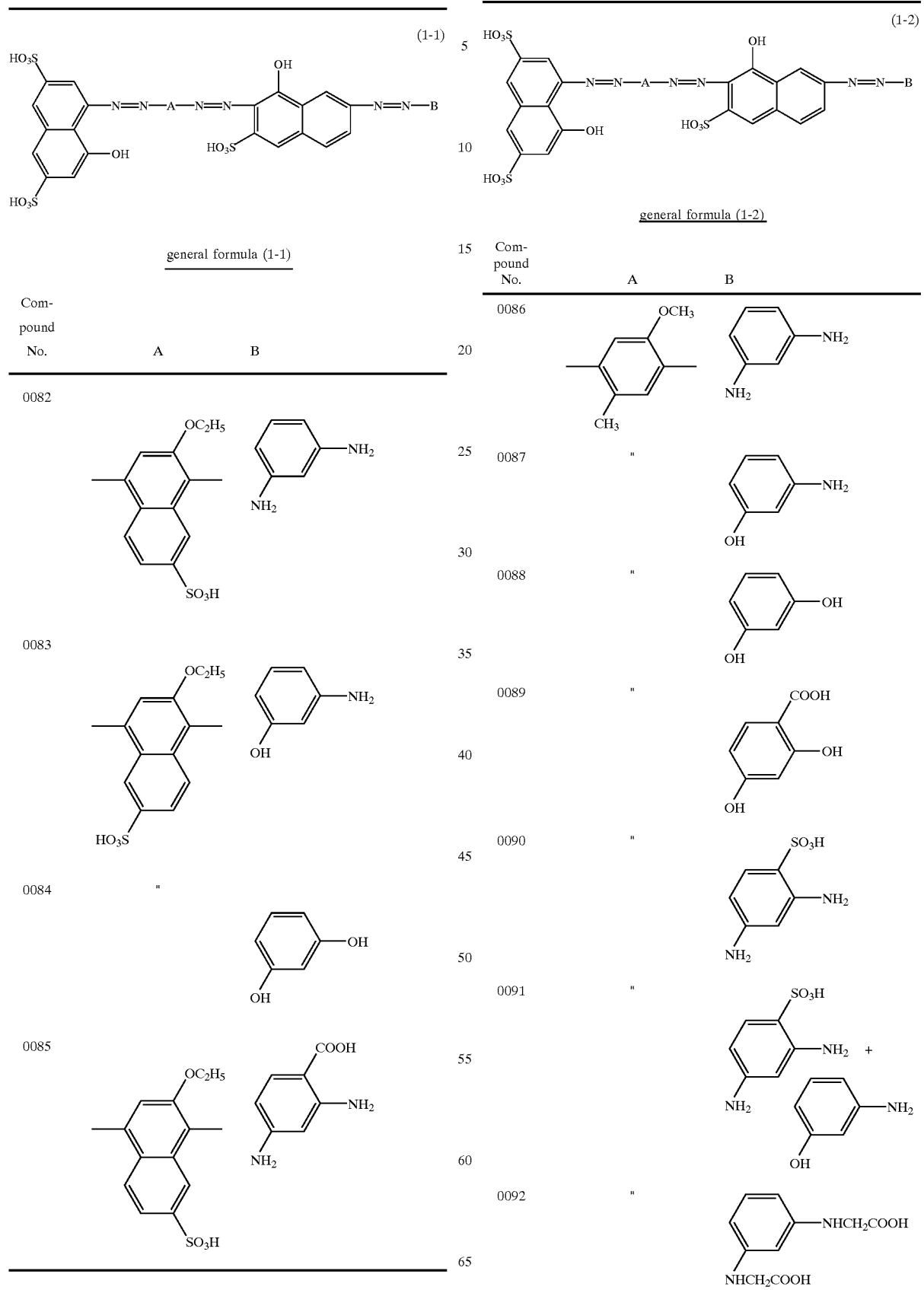

-continued (1-2)

[Structure: HO₃S-naphthalene(OH,HO₃S)-N=N-A-N=N-naphthalene(OH,HO₃S)-N=N-B]

general formula (1-2)

| Compound No. | A | B |
|---|---|---|
| 0093 | " | benzene with COOH, NH₂, NH₂ |
| 0094 | " | benzene with NHCH₂COOH, NHCOCH₃ |
| 0095 | benzene with OCH₃, two CH₃, NHCOCH₃ | benzene with NH₂, NH₂ |
| 0096 | " | benzene with NH₂, OH |
| 0097 | " | benzene with OH, OH |
| 0098 | " | benzene with COOH, OH, OH |
| 0099 | " | benzene with SO₃H, NH₂, NH₂ |

-continued (1-2)

[Structure: HO₃S-naphthalene(OH,HO₃S)-N=N-A-N=N-naphthalene(OH,HO₃S)-N=N-B]

general formula (1-2)

| Compound No. | A | B |
|---|---|---|
| 0100 | " | benzene with NHCH₂COOH, NHCH₂COOH |
| 0101 | benzene with OCH₃, two CH₃, NHCOCH₃ | benzene with COOH, NH₂, NHCOCH₃ |
| 0102 | " | benzene with NHCH₂COOH, NHCOCH₃ |
| 0103 | " | benzene with SO₃H, NH₂, NH₂ + benzene with NH₂, OH |
| 0104 | benzene with OCH₂CH₂OCH₃, two CH₃, NHCOCH₃ | benzene with NH₂, NH₂ |
| 0105 | " | benzene with NH₂, OH |
| 0106 | " | benzene with OH, OH |

-continued general formula (1-2)

| Compound No. | A | B |
|---|---|---|
| 0107 | " | benzene with SO₃H, NH₂, NH₂ |
| 0108 | dimethyl naphthalene with SO₃H | benzene with NH₂, NH₂ |
| 0109 | " | benzene with NH₂, OH |
| 0110 | " | benzene with OH, OH |
| 0111 | " | benzene with COOH, OH, OH |
| 0112 | " | benzene with SO₃H, NH₂, NH₂ |
| 0113 | " | benzene with NH₂, NHCOCH₃ |

-continued general formula (1-2)

| Compound No. | A | B |
|---|---|---|
| 0114 | " | benzene with SO₃H, NH₂, NH₂ + benzene with NH₂, OH |
| 0115 | dimethyl naphthalene with SO₃H | benzene with NH₂, NH₂ |
| 0116 | " | benzene with NH₂, OH |
| 0117 | " | benzene with OH, OH |
| 0118 | " | benzene with SO₃H, NH₂, NH₂ |
| 0119 | dimethyl methoxy naphthalene with SO₃H | benzene with NH₂, NH₂ |

(1-2)
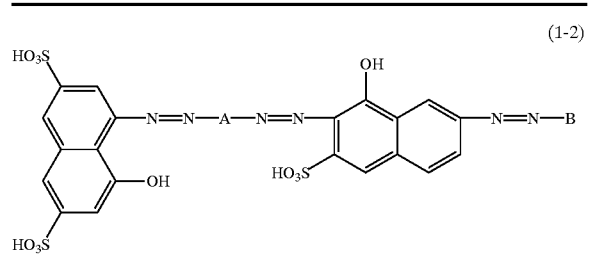
general formula (1-2)
| Compound No. | A | B |
|---|---|---|
| 0120 | " |  |
| 0121 | " |  |
| 0122 | " | 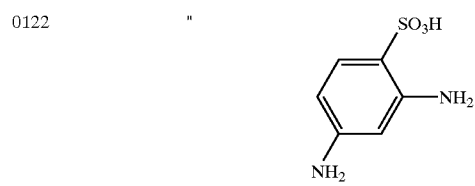 |
| 0123 | 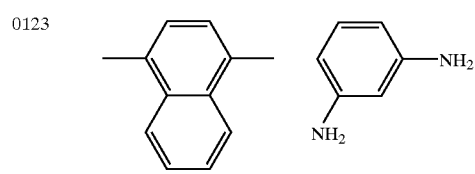 | 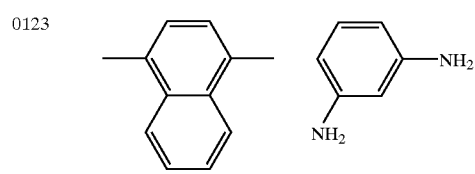 |
| 0124 | " |  |
| 0125 | " |  |
| 0126 | " | 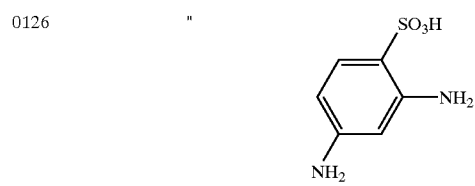 |
(1-2)
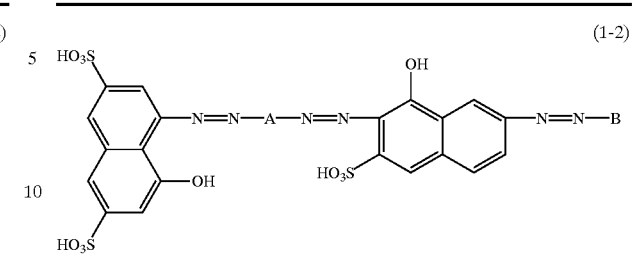
general formula (1-2)
| Compound No. | A | B |
|---|---|---|
| 0127 | 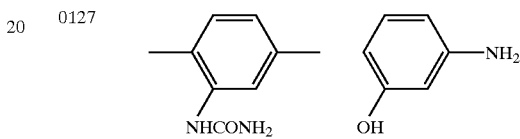 | 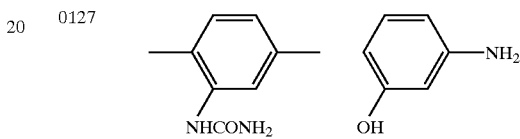 |
| 0128 | " |  |
| 0129 | " |  |
| 0130 | 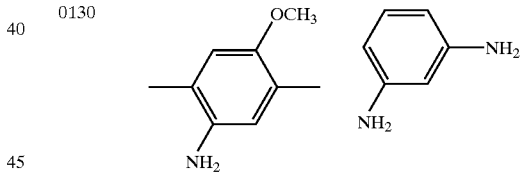 | 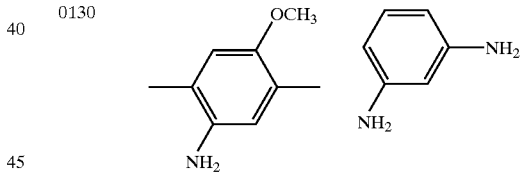 |
| 0131 | " |  |
| 0132 | " |  |
| 0133 | " |  |

-continued

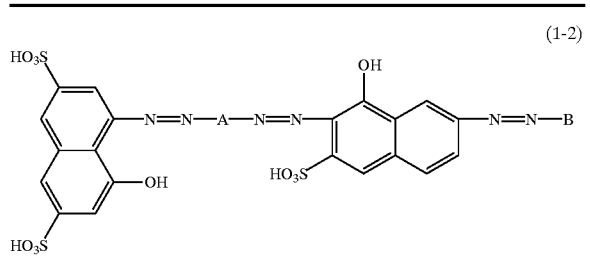

general formula (1-2)

-continued

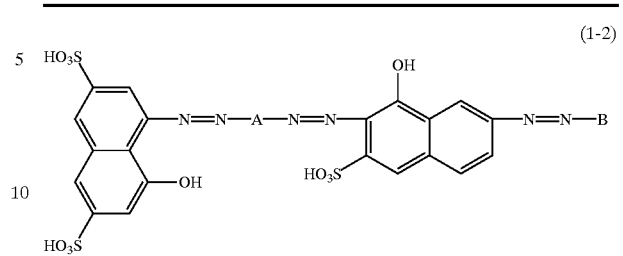

general formula (1-2)

| Compound No. | A | B |
|---|---|---|
| 0134 | " | 3,5-bis(NHCH₂COOH)phenyl |
| 0135 | " | 3-NH₂-5-OCH₂COOH phenyl |
| 0136 | 2,5-dimethyl-4-OCH₂CH₂OCH₃-phenyl-NH₂ | 2-NH₂-4-NH₂-benzenesulfonic acid |
| 0137 | 2,5-dimethyl-3,6-di-OCH₃-phenyl | 2-NH₂-4-NH₂-benzenesulfonic acid |
| 0138 | " | 3-NH₂-5-OCH₂COOH phenyl |
| 0139 | " | 3,5-dihydroxyphenyl |
| 0140 | 2,5-dimethyl-3,6-di-OCH₃-phenyl | 3-NH₂-5-OH-phenyl |

| Compound No. | A | B |
|---|---|---|
| 0141 | " | 3,5-diaminophenyl |
| 0142 | " | 2,4-dihydroxybenzoic acid |
| 0143 | 2,5-dimethyl-4-COOH-phenyl-CH₃ | 2-NH₂-4-NH₂-benzenesulfonic acid |
| 0144 | " | 3-NH₂-5-OH-phenyl |
| 0145 | 2,5-dimethyl-4-OCH₃-5-OH-phenyl | 2-NH₂-4-NH₂-benzenesulfonic acid |
| 0146 | " | 3,5-diaminophenyl |
| 0147 | " | 3,5-dihydroxyphenyl |

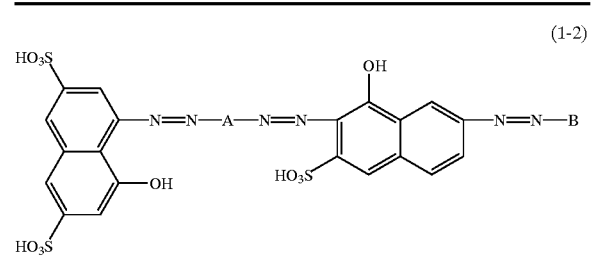
general formula (1-2)
| Compound No. | A | B |
|---|---|---|
| 0148 | " | 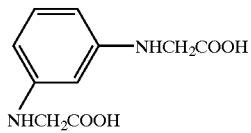 |
| 0149 | 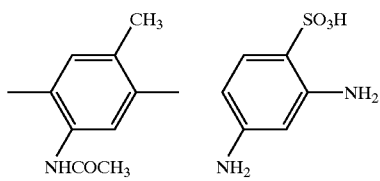 | |
| 0150 | " | 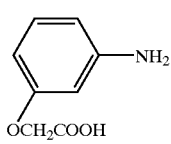 |
| 0151 | " | 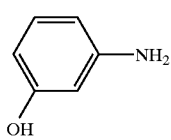 |
| 0152 | 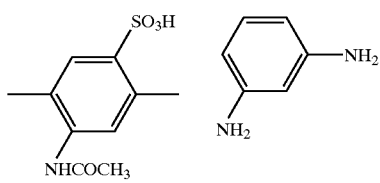 | |
| 0153 | " | 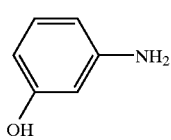 |
| 0154 | " | 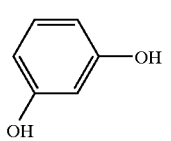 |
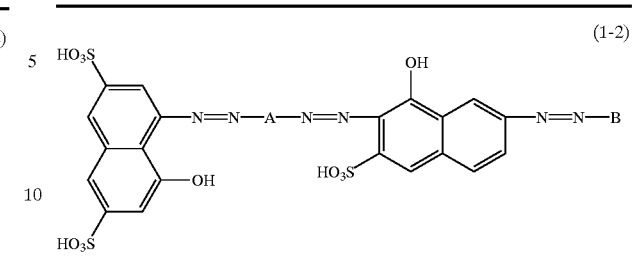
general formula (1-2)
| Compound No. | A | B |
|---|---|---|
| 0155 | 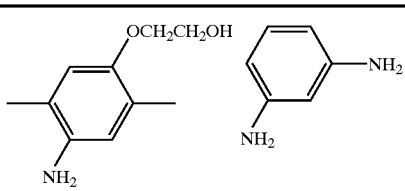 | |
| 0156 | " |  |
| 0157 | 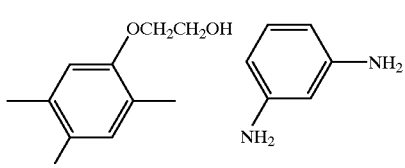 | |
| 0158 | " | 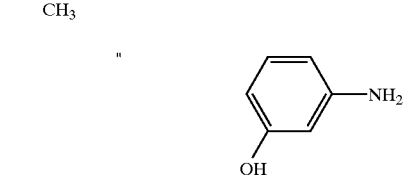 |
| 0159 | 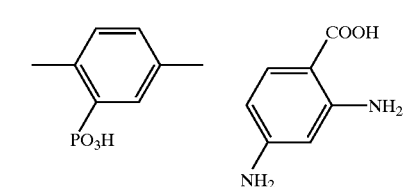 | |
| 0160 | " | 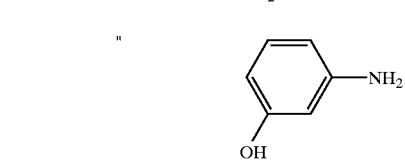 |
| 0161 | 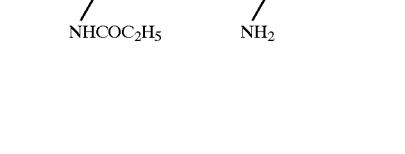 | |

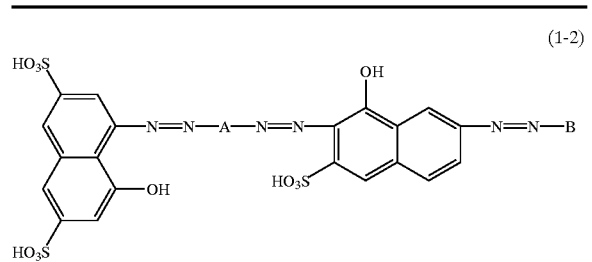
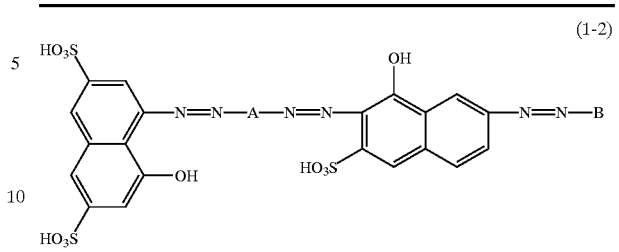
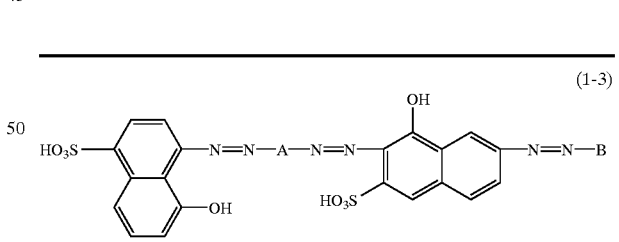

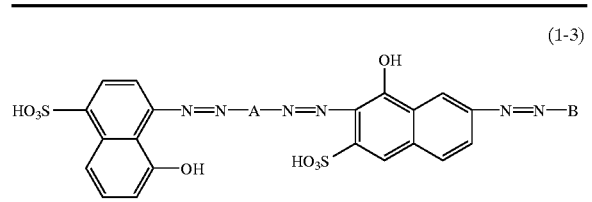

general formula (1-3)

| Compound No. | A | B |
|---|---|---|
| 0172 | " | (3-aminophenol) |
| 0173 | " | (resorcinol) |
| 0174 | " | (2,4-diaminobenzenesulfonic acid) |
| 0175 | (4-methoxy-2,5-dimethyl-N-acetylaniline) | (m-phenylenediamine) |
| 0176 | " | (2,5-diaminobenzenesulfonic acid) |
| 0177 | " | (3-aminophenol) |
| 0178 | " | (resorcinol) |

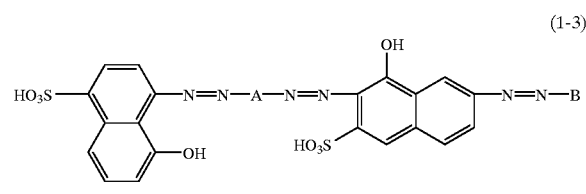

general formula (1-3)

| Compound No. | A | B |
|---|---|---|
| 0179 | " | (2,4-diaminobenzenesulfonic acid) + (3-aminophenol) |
| 0180 | " | (N,N'-bis(carboxymethyl)-m-phenylenediamine) |
| 0181 | (4-(2-methoxyethoxy)-2,5-dimethyl-N-acetylaniline) | (3-aminophenol) |
| 0182 | " | (resorcinol) |
| 0183 | " | (2,5-diaminobenzenesulfonic acid) |
| 0184 | (5,8-dimethyl-2-naphthol-... sulfonic acid) | (m-phenylenediamine) |
| 0185 | " | (4-aminophenol) |

-continued general formula (1-3)

| Compound No. | A | B |
|---|---|---|
| 0186 | " | benzene with SO₃H, NH₂, NH₂ |
| 0187 | naphthalene with CH₃, CH₃, SO₃H | benzene with NH₂, NH₂ |
| 0188 | " | benzene with NH₂, OH |
| 0189 | " | benzene with SO₃H, NH₂, NH₂ |
| 0190 | naphthalene with OCH₃, CH₃, CH₃, SO₃H | benzene with NH₂, NH₂ |
| 0191 | " | benzene with NH₂, OH |
| 0192 | naphthalene with CH₃, CH₃ | benzene with NH₂, NH₂ |

-continued general formula (1-3)

| Compound No. | A | B |
|---|---|---|
| 0193 | " | benzene with NH₂, OH |
| 0194 | " | benzene with SO₃H, NH₂, NH₂ |
| 0195 | " | benzene with OH, OH |
| 0196 | benzene with OCH₃, CH₃, CH₃, NH₂ | benzene with NH₂, NH₂ |
| 0197 | " | benzene with NH₂, OH |
| 0198 | " | benzene with SO₃H, NH₂, NH₂ |
| 0199 | " | benzene with NHCH₂COOH, NHCH₂COOH |

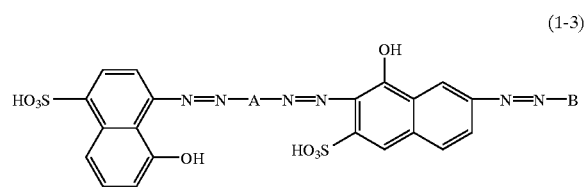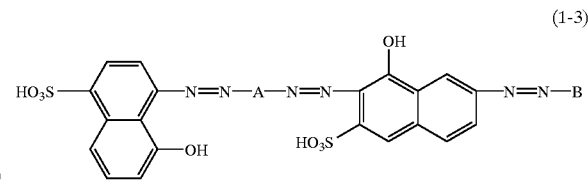

-continued general formula (1-3)

| Compound No. | A | B |
|---|---|---|
| 0214 | " | 1,3-diaminobenzene (3-aminoaniline) |
| 0215 | 4-ethoxy-2-methyl-5-(propionylamino)phenyl (OC₂H₅, CH₃, NHCOC₂H₅ substituted) | 4-amino-3-aminobenzenesulfonic acid (SO₃H, NH₂, NH₂) |
| 0216 | " | 3-aminophenol (NH₂, OH) |
| 0217 | 4,5-dimethyl-8-sulfonaphthyl | 3-hydroxyphenol (OH, OH) |
| 0218 | 4,8-dimethyl-5-sulfonaphthyl | 1,3-diaminobenzene |
| 0219 | 6-ethoxy-5,8-dimethyl-2-sulfonaphthyl | 1,3-diaminobenzene |
| 0220 | 2,5-dimethyl-3-phosphonophenyl | 4-amino-2-aminobenzenesulfonic acid | general formula (1-4)

| Compound No. | A | B |
|---|---|---|
| 0221 | 2-methoxy-4,5-dimethylphenyl (OCH₃, CH₃, CH₃) | 1,3-diaminobenzene |
| 0222 | " | 3-aminophenol |
| 0223 | " | 1,3-dihydroxybenzene (resorcinol) |
| 0224 | " | 2,4-dihydroxybenzoic acid (COOH, OH, OH) |
| 0225 | " | 4-amino-2-aminobenzenesulfonic acid |
| 0226 | " | 4-amino-2-aminobenzenesulfonic acid + 3-aminophenol |
| 0227 | " | 1,3-bis(carboxymethylamino)benzene (NHCH₂COOH, NHCH₂COOH) |

-continued
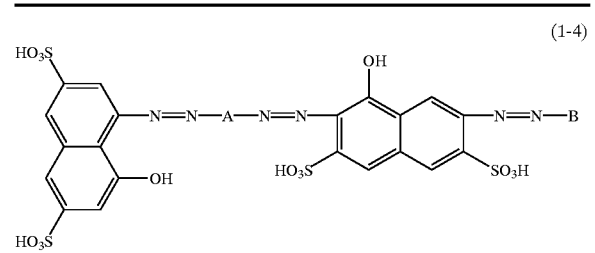
general formula (1-4)
| Compound No. | A | B |
|---|---|---|
| 0228 | " |  |
| 0229 | " | 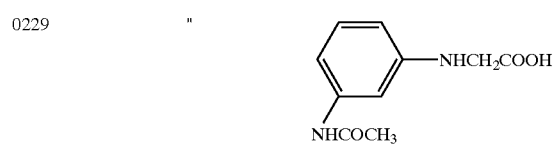 |
| 0230 | 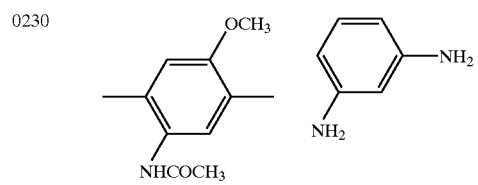 | |
| 0231 | " |  |
| 0232 | " |  |
| 0233 | " | 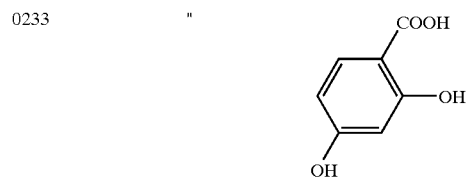 |
| 0234 | " | 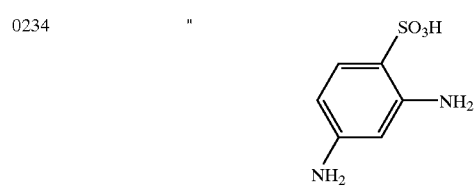 |
-continued
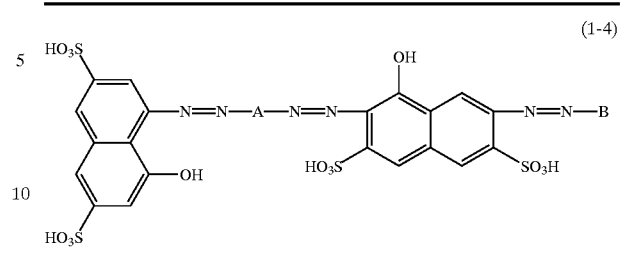
general formula (1-4)
| Compound No. | A | B |
|---|---|---|
| 0235 | " |  |
| 0236 | 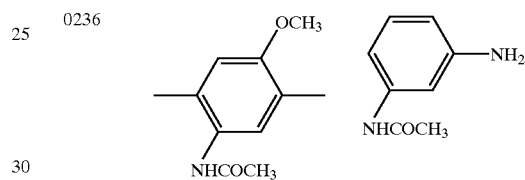 | |
| 0237 | " | 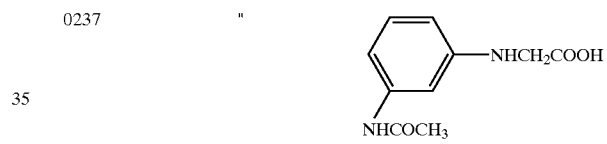 |
| 0238 | " | 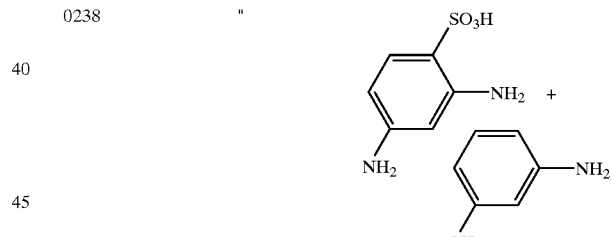 |
| 0239 | 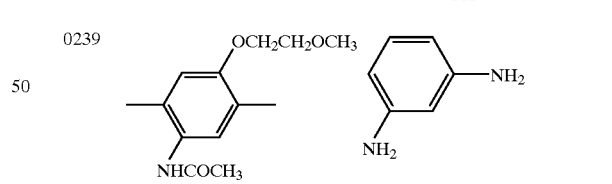 | |
| 0240 | " |  |
| 0241 | " |  |

-continued
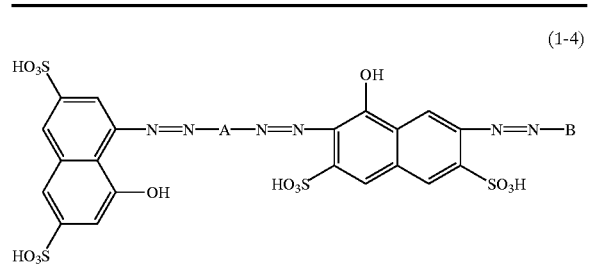
(1-4)
general formula (1-4)
| Compound No. | A | B |
|---|---|---|
| 0242 | " | 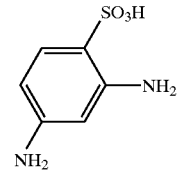 |
| 0243 | 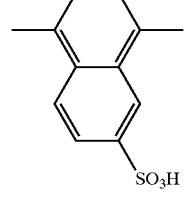 | 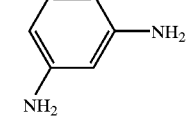 |
| 0244 | " | 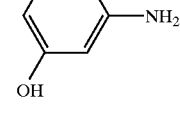 |
| 0245 | " | 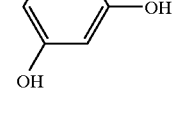 |
| 0246 | " | 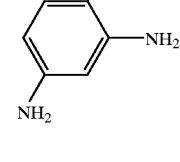 |
| 0247 | " | 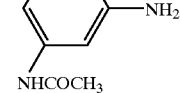 |
-continued
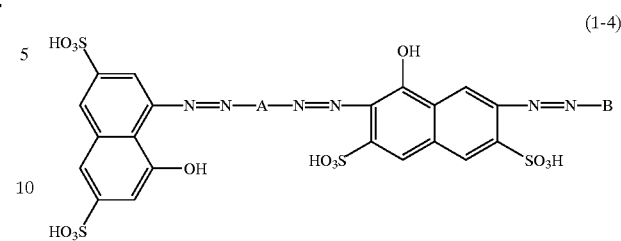
(1-4)
general formula (1-4)
| Compound No. | A | B |
|---|---|---|
| 0248 | " | 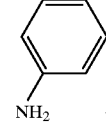 + 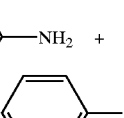 |
| 0249 | 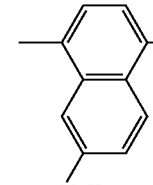 | 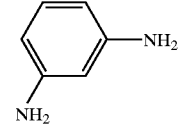 |
| 0250 | " | 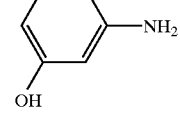 |
| 0251 | " | 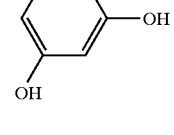 |
| 0252 | " | 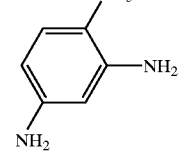 |
| 0253 | 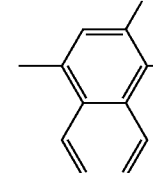 | 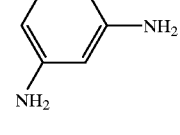 |

-continued
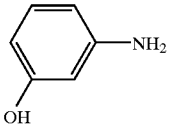
general formula (1-4)
| Compound No. | A | B |
|---|---|---|
| 0254 | " | 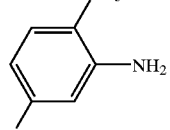 |
| 0255 | " | 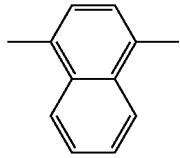 |
| 0256 | " | 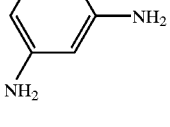 |
| 0257 | 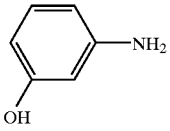 | 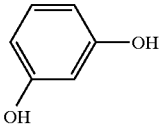 |
| 0258 | " | 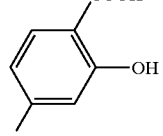 |
| 0259 | " | 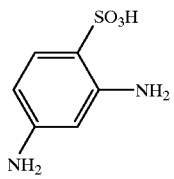 |
| 0260 | " | 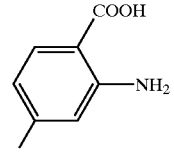 |
-continued
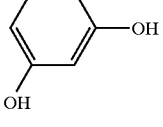
general formula (1-4)
| Compound No. | A | B |
|---|---|---|
| 0261 | " | 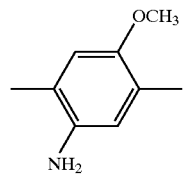 |
| 0262 | " | 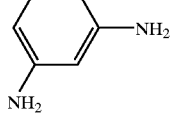 |
| 0263 | 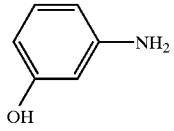 | 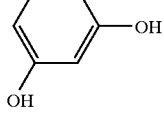 |
| 0264 | " | 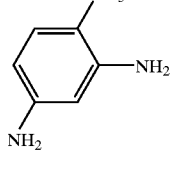 |
| 0265 | " | 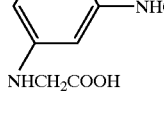 |
| 0266 | " |  |
| 0267 | " |  |

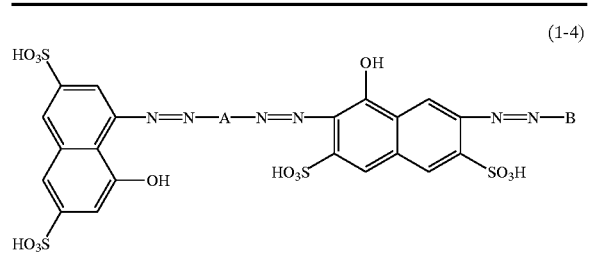
general formula (1-4)
| Compound No. | A | B |
|---|---|---|
| 0268 | " |  |
| 0269 | | 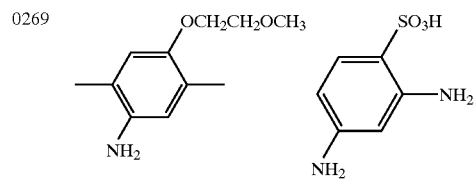 |
| 0270 | | 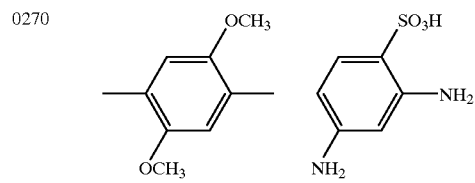 |
| 0271 | " |  |
| 0272 | " |  |
| 0273 | | 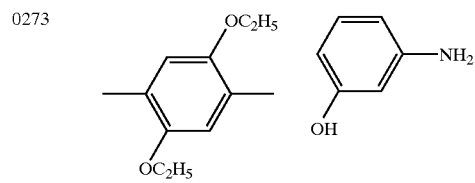 |
| 0274 | " |  |
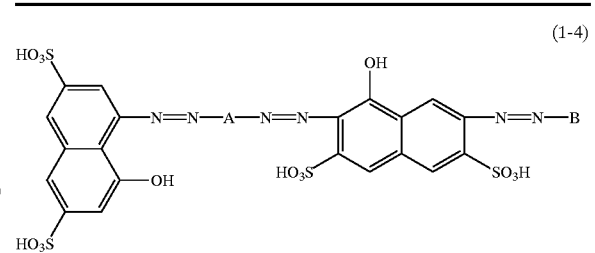
general formula (1-4)
| Compound No. | A | B |
|---|---|---|
| 0275 | | |
| 0276 | " | 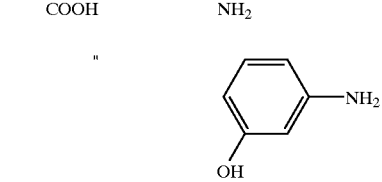 |
| 0277 | | 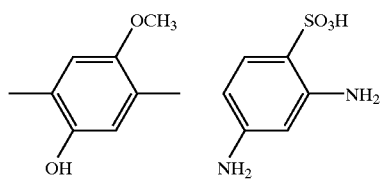 |
| 0278 | " | 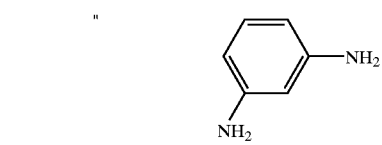 |
| 0279 | " | 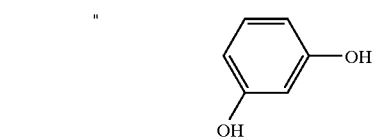 |
| 0280 | " |  |
| 0281 | | 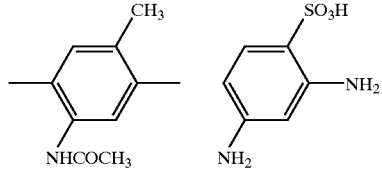 |

-continued

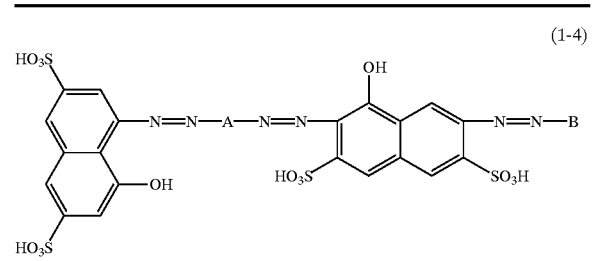

general formula (1-4)

| Compound No. | A | B |
|---|---|---|
| 0282 | " | 3-amino, 2-OCH₂COOH phenyl |
| 0283 | " | 3-amino, 2-OH phenyl |
| 0284 | 2,5-dimethyl-4-NHCOCH₃-phenyl with SO₃H | 2,4-diamino phenyl |
| 0285 | " | 3-amino, 2-OH phenyl |
| 0286 | " | 3,4-diOH phenyl |
| 0287 | 2,5-dimethyl-4-NH₂-phenyl with OCH₂CH₂OH | 2,4-diamino phenyl |
| 0288 | " | 3-amino, 2-OH phenyl |

-continued

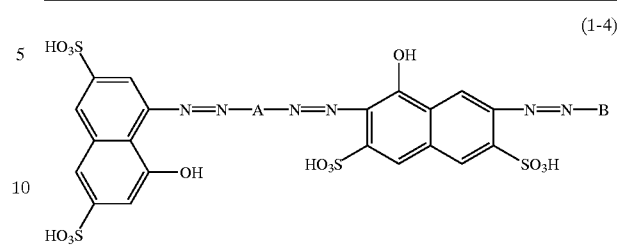

general formula (1-4)

| Compound No. | A | B |
|---|---|---|
| 0289 | 2,5-dimethyl phenyl with OCH₂CH₂OH and CH₃ | 2,4-diamino phenyl with SO₃H |
| 0290 | " | 3-amino, 2-OH phenyl |
| 0291 | 2,5-dimethyl phenyl with PO₃H | 2-amino, 4-amino phenyl with COOH |
| 0292 | 2,5-dimethyl-4-NHCOC₂H₅-phenyl with OC₂H₅ | 2,4-diamino phenyl with SO₃H |
| 0293 | " | 3-amino, 2-OH phenyl |
| 0294 | 2,5-dimethyl-4-NHCOC₂H₅-phenyl with OCH₃ | 2,4-diamino phenyl with SO₃H |
| 0295 | " | 3-amino, 2-OH phenyl |

-continued general formula (1-4)

| Compound No. | A | B |
|---|---|---|
| 0296 | 4,8-dimethyl-naphthalene-1-sulfonic acid | benzene-1,3-diol |
| 0297 | 4,8-dimethyl-naphthalene-1-sulfonic acid | benzene-1,3-diamine |
| 0298 | 2-ethoxy-1,4-dimethyl-naphthalene-7-sulfonic acid | benzene-1,3-diamine |
| 0299 | 2-ethoxy-1,4-dimethyl-naphthalene-7-sulfonic acid | 4-amino-2-hydroxy-benzene |
| 0300 | " | benzene-1,3-diol |

-continued general formula (1-4)

| Compound No. | A | B |
|---|---|---|
| 0301 | 2-ethoxy-1,4-dimethyl-naphthalene-7-sulfonic acid | 2-amino-4-amino-benzoic acid | general formula (1-5)

| Compound No. | A | B |
|---|---|---|
| 0302 | 2-methoxy-3,5-dimethyl-6-methyl-benzene | benzene-1,3-diamine |
| 0303 | " | 3-aminophenol |
| 0304 | " | benzene-1,3-diol |

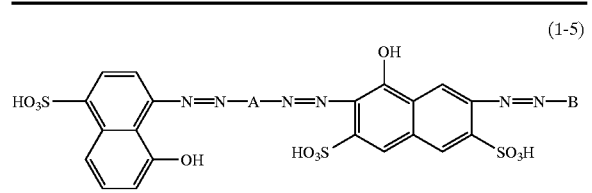
general formula (1-5)
| Compound No. | A | B |
|---|---|---|
| 0305 | " | 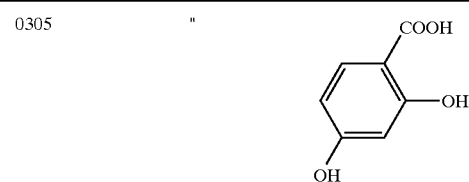 |
| 0306 | " | |
| 0307 | 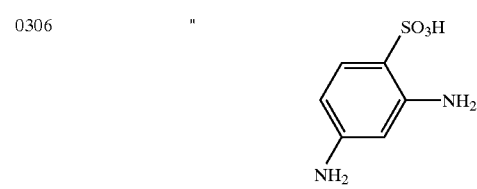 | |
| 0308 | " | 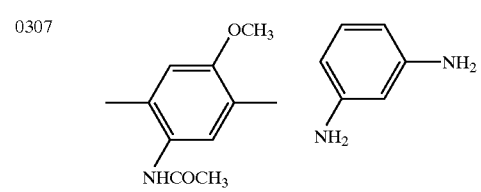 |
| 0309 | " |  |
| 0310 | " |  |
| 0311 | " |  |
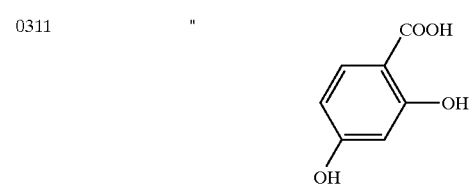
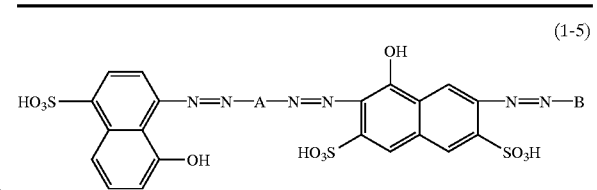
general formula (1-5)
| Compound No. | A | B |
|---|---|---|
| 0312 | " | 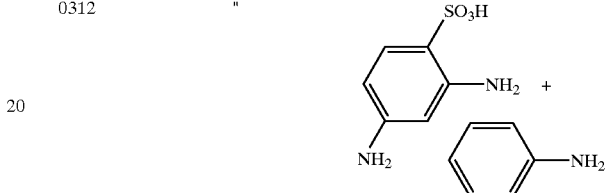 + |
| 0313 | " | 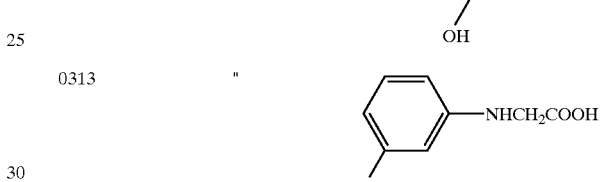 |
| 0314 | 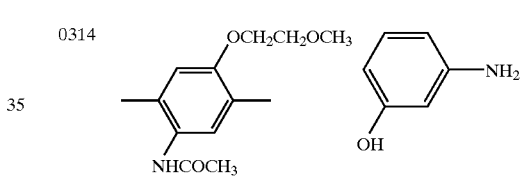 | |
| 0315 | " |  |
| 0316 | " |  |
| 0317 | 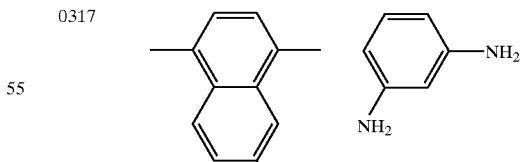 | |
| 0318 | " | 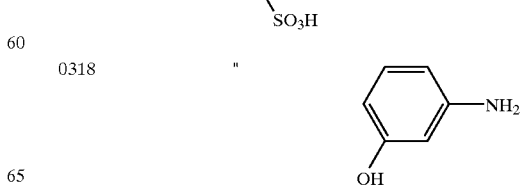 |

-continued
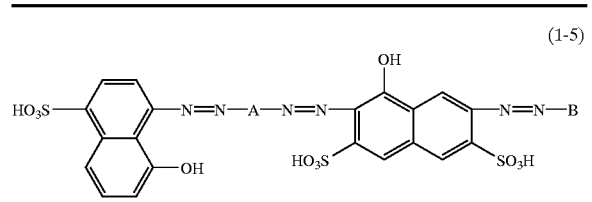
general formula (1-5)
| Compound No. | A | B |
|---|---|---|
| 0319 | " | 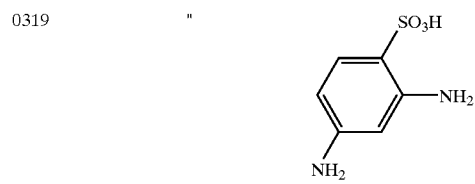 |
| 0320 | " | 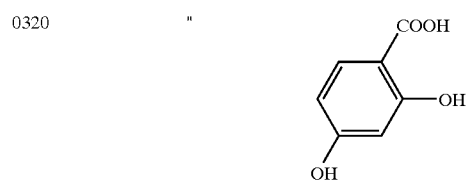 |
| 0321 | 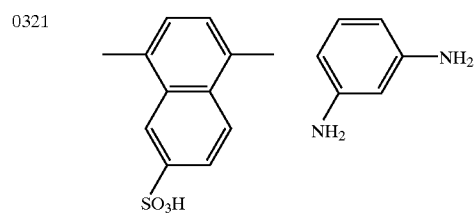 | 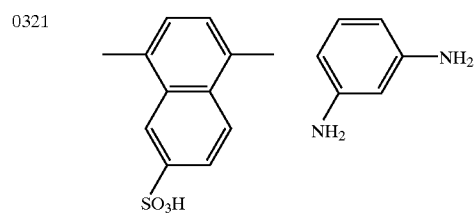 |
| 0322 | " | 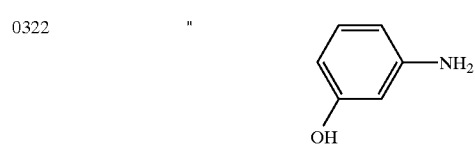 |
| 0323 | " | 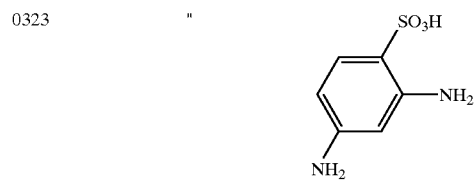 |
| 0324 | 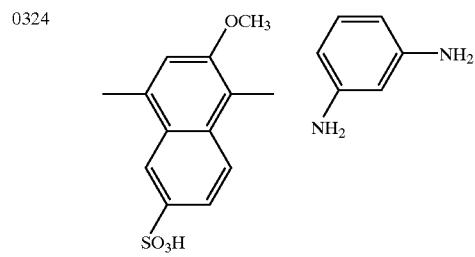 | 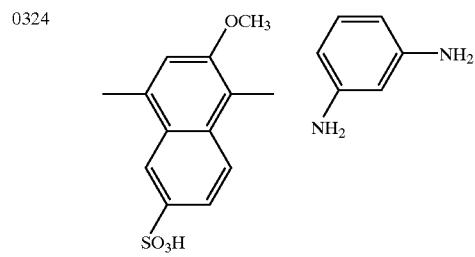 |
-continued
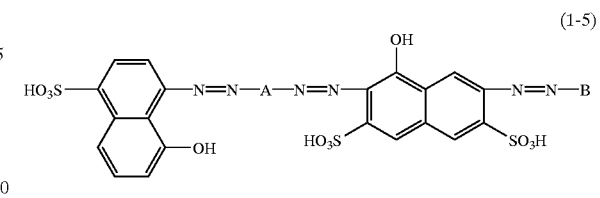
general formula (1-5)
| Compound No. | A | B |
|---|---|---|
| 0325 | " |  |
| 0326 | 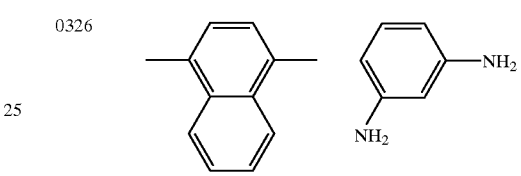 | 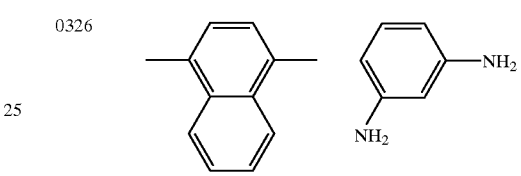 |
| 0327 | " |  |
| 0328 | " |  |
| 0329 | " | 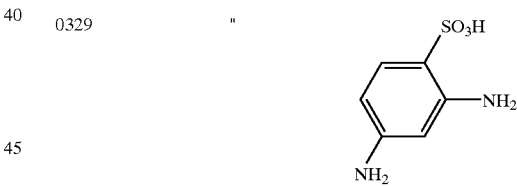 |
| 0330 | 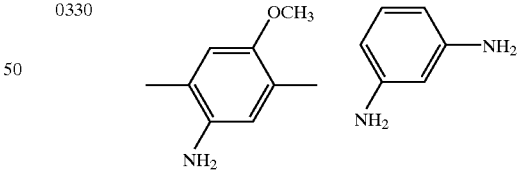 | 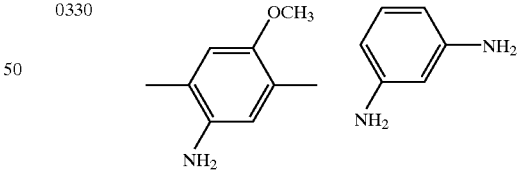 |
| 0331 | " |  |
| 0332 | " |  |

-continued
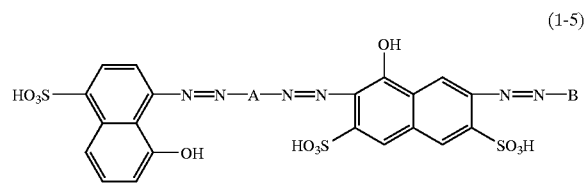
general formula (1-5)
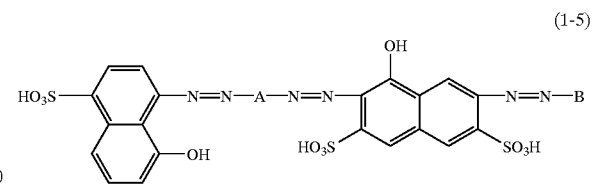
general formula (1-5)

-continued

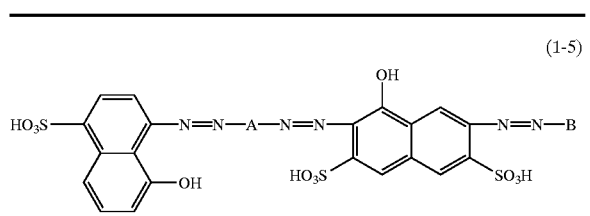

general formula (1-5)

| Compound No. | A | B |
|---|---|---|
| 0347 | 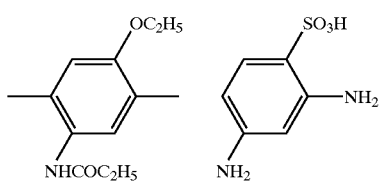 | |
| 0348 | 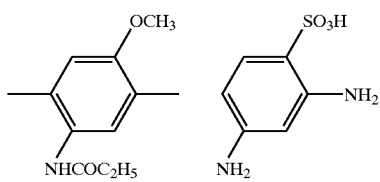 | |
| 0349 | " | 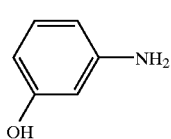 |
| 0350 | 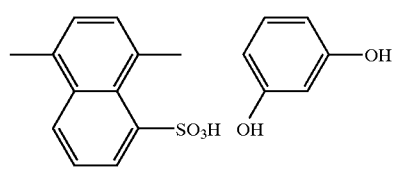 | |
| 0351 | 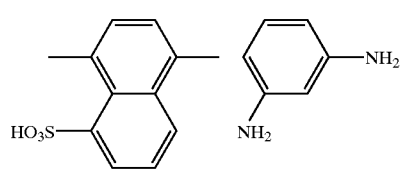 | |
| 0352 | 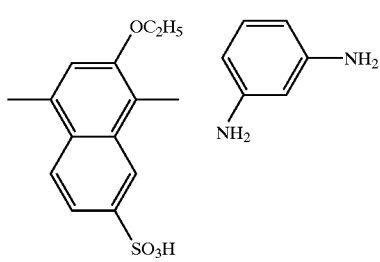 | |

-continued

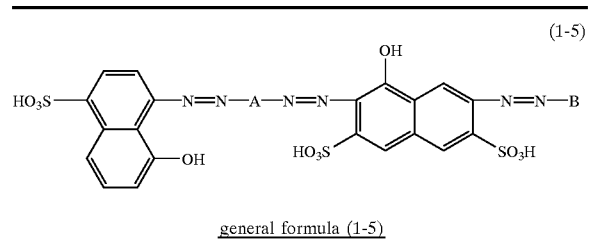

general formula (1-5)

| Compound No. | A | B |
|---|---|---|
| 0353 | 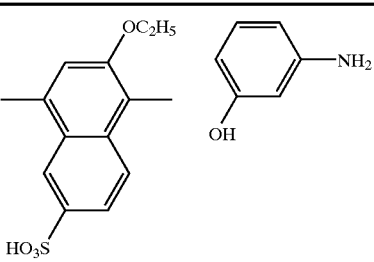 | |
| 0354 | " | 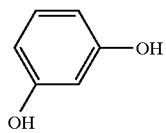 |

The compound represented by the general formula (1) can be synthesized, for example, according to the following method. That is, the compound of the general formula (1) can be synthesized by:

diazotizing a compound of the general formula (6):

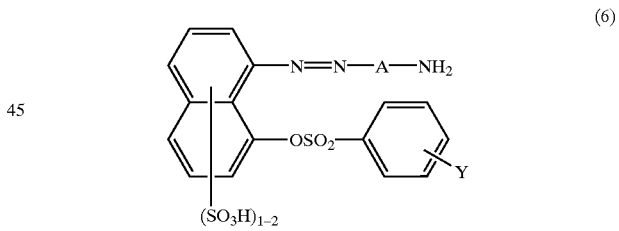

(6)

wherein Y is hydrogen, halogen or (C1–C4) alkyl and A is as defined above, in an aqueous medium;

coupling with a compound of the general formula (7):

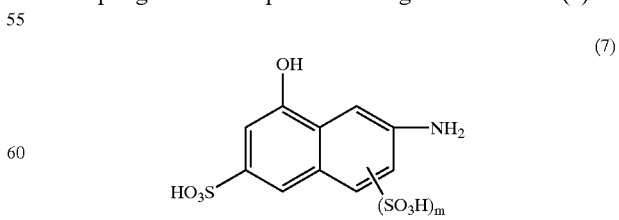

(7)

wherein m is 0 or 1;

hydrolyzing the resultant disazo compound of the general formula (8):

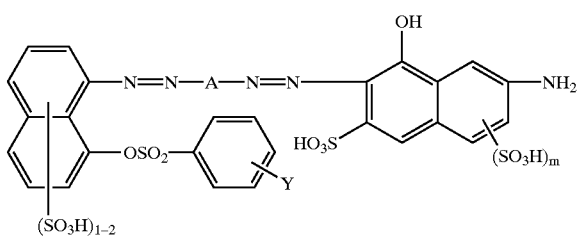

wherein A, Y and m are as defined above, to a compound of the general formula (9):

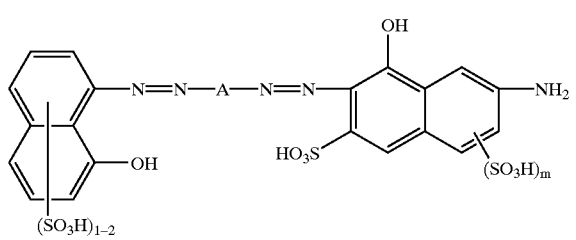

wherein A and m are as defined above;
diazotizing the compound of the general formula (9); and coupling with a compound of the general formula (4'):

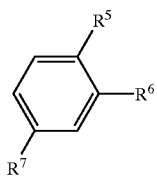

wherein $R^5$, $R^6$ and $R^7$ are as defined above. Alternatively, the compound of the general formula (8) may be diazotized again, coupled with the compound of the general formula (4') and then hydrolyzed to obtain the compound of the general formula (1).

Each of the compounds of the general formulae (6), (7) and (4') can be prepared according to the known method per se.

Diazotization of the compound of the general formula (6) is effected according to the known method per se, for example, using nitrites such as an alkali metal nitrite (e.g. sodium nitrite) at −5 to 30° C., preferably 0 to 10° C. in an aqueous inorganic acid medium.

Coupling of the diazo compound of the general formula (6) with the compound of the general formula (7) is effected under the known condition per se. It is conveniently effected in an aqueous or aqueous organic medium at −5 to 30° C., preferably 0 to 10° C. under the weak acidic or alkaline pH. Preferably, it is effected under the neutral or alkaline pH, e.g. 7 to 11. The pH is adjusted by the addition of any base. The base to be used includes alkali metal hydroxides such as lithium hydroxide and sodium hydroxide; alkali metal carbonates such as lithium carbonate, sodium carbonate and potassium carbonate; alkali metal acetates such as sodium acetate; ammonia; or organic amines. The compounds of the general formulae (6) and (7) are used in approximately stoichiometric amounts in this reaction.

The preparation of the compound of the general formula (9) by hydrolyzing the compound of the general formula (8) is effected according to the known method per se. The heating in an aqueous alkaline medium is convenient. For example, it is effected by adding sodium or potassium hydroxide to a reaction solution containing the compound of the general formula (8) until the pH is 11 or more and then heating to the temperature of 20 to 150° C., preferably 30 to 100° C. Preferably, the pH of the reaction solution is kept to be 10 to 12.

Diazotization of the compound of the general formula (9) resulting from hydrolyzing is effected under the same condition as that described in the diazotization of the compound of the general formula (6).

Coupling of the diazotized product of the compound of the general formula (9) with the compound of the general formula (4') is effected under the known condition per se. It is effected in an aqueous or aqueous organic medium at the temperature of 0 to 30° C., preferably 10 to 20° C. and the pH of 4 to 10, preferably 6 to 8.

After the coupling reaction, the compound represented by the general formula (1) of the present invention can be isolated in the form of free acid by adding any mineral acid. The thus-isolated free acid may be washed with water or an acidified water to remove inorganic salts. The acid type dye having a low salt content can be converted to a solution containing its corresponding salt by neutralizing with hydroxide and/or carbonate (e.g. LiOH, $Li_2CO_3$, NaOH, $Na_2CO_3$ or $K_2CO_3$) or amine in an aqueous medium. Preferable examples of the amine include ammonia, ethanolamine, diethanolamine, triethanolamine, N-methyl-N-ethanolamine, N-methyl-N,N-diethanolamine, 2-(2-hydroxyethoxy)-ethylamine, di-2-(2-hydroxyethoxy)-ethylamine, tri-2-(2-hydroxyethoxy)-ethylamine or the like.

The trisazo compound represented by the general formula (1) is suitable for dyeing papers, natural fibers such as celluloses, wools and leathers and blended yarn fabrics of natural and synthetic fibers. Further, it is suitable for the preparation of writing inks and recording liquid.

The reaction liquid containing the trisazo compound represented by the general formula (1) of the present invention can be used as it is in the preparation of recording ink compositions. Alternatively, the above compound is dried, for example, spray-dried and then processed into an ink composition.

As a finished product, the recording ink composition contains the trisazo compound represented by the general formula (1) of the present invention in an amount of, for example, about 0.1 to 20% by weight, preferably about 1 to 10% by weight, more preferably about 2 to 8% by weight.

The ink composition of the present invention may comprises a water-soluble organic solvent in an amount of, for example, 0 to 30% by weight and an ink formulating agent in an amount of, for example, 0 to 5% by weight.

The aqueous ink composition of the present invention comprises the trisazo compound represented by the general formula (1) dissolved in water or an aqueous solvent (water containing any water-soluble organic solvent or any water-compatible organic solvent). When this aqueous ink composition is used as an ink for ink jet printers, the trisazo compounds having less amounts (for example, about 1% by weight or less) of inorganic substances such as chlorides and sulfates of metallic cations are preferably used. Such trisazo compounds having less amounts of the inorganic substances may be prepared by subjecting to the desalting treatment according to any conventional method such as the method using a reverse osmotic membrane.

Examples of water-soluble organic solvents include (C1–C4)alkanol such as methanol, ethanol, propanol, isopropanol, butanol, isobutanol, sec-butanol and tert-butanol; carboxamides such as N,N-dimethylformamide and N,N-dimethylacetamide; lactams such as ε-caprolactam and N-methylpyrrolidin-2-one; cyclic ureas such as 1,3-dimethylimidazolin-2-one and 1,3-dimethylhexahydropyrimid-2-one; ketones and ketoalcohols such as acetone, methyl ethyl ketone and 2-methyl-2-hydroxypentan-4-one; cyclic ethers such as tetrahydrofuran and dioxane; mono-, oligo- or poly-alkylene glycols or thioglycols having (C2–C6)alkylene units such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; polyol (triol) such as glycerol and hexane-1,2,6-triol; (C1–C4)alkyl ethers of polyhydric alcohols such as ethylene glycol monomethyl ether or monoethyl ether, diethylene glycol monomethyl ether or monoethyl ether and triethylene glycol monomethyl ether or monoethyl ether; γ-butyrolactone; disulfoxide and the like.

Examples of ink formulating agents include antimicrobial and antiseptic agents, pH adjusters, chelating agents, antirusting agents, water-soluble UV absorbing agents, water-soluble polymeric compounds, dye solubilizing agents, surfactants and the like.

Examples of antimicrobial and antiseptic agents include anhydrous sodium acetate, sodium sorbate, sodium 2-pyridinethiol-1-oxide, sodium benzoate, sodium pentachlorophenol and the like.

As pH adjusters, any substances can be used as long as they can adjust pH of an ink within the suitable range, for example, in the range from 8.0 to 11.0 without adversely affecting the ink to be formulated. Examples thereof include alkanolamines such as diethanolamine and triethanolamine; alkali metal hydroxides such as lithium hydroxide, sodium hydroxide and potassium hydroxide; ammonium hydroxide; alkali metal carbonates such as lithium carbonate, sodium carbonate and potassium carbonate; and the like.

Examples of chelating agents include sodium ethylenediamine tetraacetate, sodium nitrilotriacetate, sodium hydroxyethylethylene diamine triacetate, sodium diethylenetriaminepentacetate, sodium uracil diacetate and the like.

Examples of antirusting agents include acidic sulfite, sodium thiosulfate, ammonium thioglycolate, diisopropylammonium nitrite, pentaerythritol tetranitrate, dicyclohexylammonium nitrite and the like.

Examples of water-soluble polymeric compounds include polyvinyl alcohol, cellulose derivatives, polyamine, polyimine and the like.

Examples of water-soluble UV absorbing agents include sulfonated benzophenone, sulfonated benzotriazole and the like.

Examples of dye solubilizing agents include ε-caprolactam, ethylene carbonate, urea and the like.

Examples of surfactants include any known surfactants of anionic, cationic and nonionic types.

The colored article of the present invention means any article colored with the compound of the present invention or the aqueous ink composition containing said compound. Examples of the articles to be colored include, but not to be limited to, papers, fibers and clothes (cellulose, nylon, wool and the like), leathers, substrates for color filter and the like. Any coloring methods which can be mentioned are the printing method such as the dip dyeing, the textile printing, or the screen printing and the method by means of ink jet printers. Among these coloring methods, printing with an ink jet printers is preferred.

Suitably, the aqueous ink composition containing the compound represented by the general formula (1) and optionally any other compound (dye) is useful for printing, copying, marking, writing, drawing, stamping and recording, particularly ink jet printing. Thereby, black prints of high quality having a remarkably full depth of shade and good resistances properties to water, light and abrasion can be obtained. The trisazo compound represented by the general formula (1) of the present invention exhibits improved color fastness to light, especially when applied onto papers intended for ink jet printing.

The aqueous ink composition of the present invention does not produce precipitates during its storage. In case the aqueous ink composition of the present invention is used in ink jet printing, it does not cause the clogging of a jet nozzle. And, when continuously used in the ink jet printer with certain recirculation for considerably long time or intermittedly used in the ink jet printer, the aqueous ink composition of the present invention shows no change in physical properties.

EXAMPLES

The following examples will more fully illustrate the embodiments of the invention. All parts and percentages referred to herein are by weight unless otherwise indicated.

Example 1

A solution prepared by dissolving 62.1 parts of the compound of formula (10) in 500 parts of water under a weak alkaline condition and then adding 10.3 parts of sodium nitrite was added dropwise to 400 parts of 4.5% hydrochloric acid at 5 to 10° C. to diazotize.

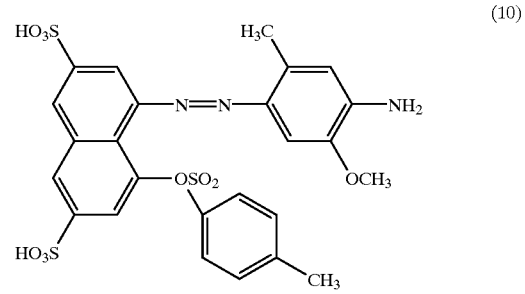

(10)

The suspension of the resultant diazo of the compound (10) was then added dropwise to an aqueous solution of 22.9 parts of 7-amino-1-hydroxynaphthalene-3-sulfonic acid dissolved in 500 parts of water at 0 to 5° C. over about 30 minutes. During this addition, the pH of the coupling was kept to be 8.5 to 9.5 by adding an aqueous sodium carbonate solution. After the addition, the reaction mixture was stirred at 5 to 10° C. for 3 hours and at 15 to 20° C. for 3 hours while keeping the pH of 8.5 to 9.0 to complete the coupling reaction. After an aqueous sodium hydroxide solution was added until the pH was 12 to 13, the reaction mixture was stirred at 80 to 95° C. and at the pH 10 to 11 for about 2 hours. Then, the solution was allowed to be cooled to room temperature and neutralized with concentrated hydrochloric acid until the pH was 6 to 7, to which sodium chloride was added to salt out. Precipitates were isolated by filtration and dried to obtain 62.4 parts of the compound of formula (11).

(11)

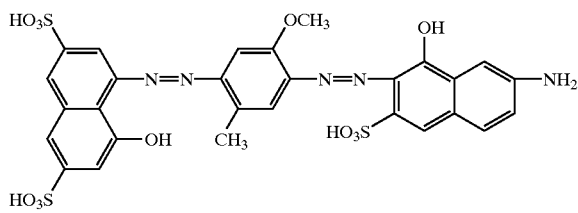

7.2 Parts of the compound of formula (11) thus obtained were dissolved in 150 parts of hot water, to which 0.83 part of sodium nitrite was added. The solution was added dropwise to 50 parts of 4.5% hydrochloric acid at 10 to 15° C. to diazotize. After 2.0 parts of 2,4-diaminobenzene-sulfonic acid was added to the suspension of the resultant diazo compound (11) at the same temperature, the reaction suspension was neutralized with an aqueous sodium carbonate solution over about 1 hour until the pH was 6.5. After the neutralization, it was stirred at 10 to 15° C. for 3 hours and at 15 to 20° C. for 3 hour while keeping 7 to 8 of pH to complete the coupling reaction. After concentrated hydrochloric acid was added until the pH was 1.0, sodium chloride was added to the reaction mixture to salt out. The thus-precipitated dye was isolated by filtration and dried to obtain 8.2 parts of the black trisazo compound (Compound No. 0005). Absorption spectrum of this compound in water was λ max=591 nm.

Example 2

The compound of formula (11) obtained in Example 1 was diazotized under the same condition as that described in Example 1. After 1.2 parts of 3-aminophenol was added to the suspension of the resultant diazonium salt, the reaction mixture was neutralized with an aqueous sodium carbonate solution over about 1 hour until the pH was 6.5. After the neutralization, it was stirred at 10 to 15° C. for 3 hours and at 15 to 20° C. for 3 hours while keeping the pH of 7 to 8 to complete the coupling reaction, to which sodium chloride was added to salt out. The thus-precipitated dye was isolated by filtration and dried to obtain 7.9 parts of the black trisazo compound (Compound No. 0002). Absorption spectrum of this compound in water was λ max=598 nm.

Example 3

Coupling was effected under the same condition as that described in Example 2 except that 3-aminophenol was replaced with 1.1 parts of m-phenylenediamine to obtain 8.1 parts of the black trisazo compound (Compound No. 0001). Absorption spectrum of this compound in water was λ max=594 nm.

Example 4

Coupling was effected under the same condition as that described in Example 2 except that 3-aminophenol was replaced with 2.3 parts of N,N'-dicarboxymethyl-m-phenylenediamine to obtain 9.0 parts of the black trisazo compound (Compound No. 0007). Absorption spectrum of this compound in water was λ max=582 nm.

Example 5

Coupling was effected under the same condition as that described in Example 2 except that 3-aminophenol was replaced with 1.2 parts of resorcin to obtain 8.2 parts of the black trisazo compound (Compound No. 0003). Absorption spectrum of this compound in water was λ max=597 nm.

Example 6

A solution prepared by dissolving 75.1 parts of the compound of formula (12) in 500 parts of water under a weak alkaline condition and then adding 10.3 parts of sodium nitrite was added dropwise to 400 parts of 4.5% hydrochloric acid at 5 to 10° C. to diazotize.

(12)

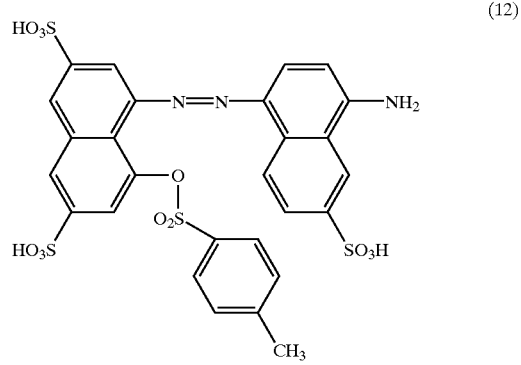

The suspension of the resultant diazo compound (12) was added dropwise to an aqueous solution of 22.9 parts of 7-amino-1-hydroxynaphthalene-3-sulfonic acid dissolved in 500 parts of water at 0 to 5° C. over about 30 minutes. During this addition, the pH of the coupling was kept to be 8.5 to 9.5 by adding an aqueous sodium carbonate solution. After the addition, the reaction mixture was stirred at 5 to 10° C. for 3 hours and at 15 to 20° C. for 3 hours while keeping the pH of 8.5 to 9.0 to complete the coupling reaction. After a sodium hydroxide solution was added until the pH was 12 to 13, the reaction mixture was stirred at 80 to 85° C. for about 2 hours. Then, the solution was allowed to be cooled to room temperature and neutralized with concentrated hydrochloric acid until the pH was 6 to 7, to which sodium chloride was added to salt out. Precipitates were isolated by filtration and dried to obtain 68.2 parts of the compound of formula (13).

(13)

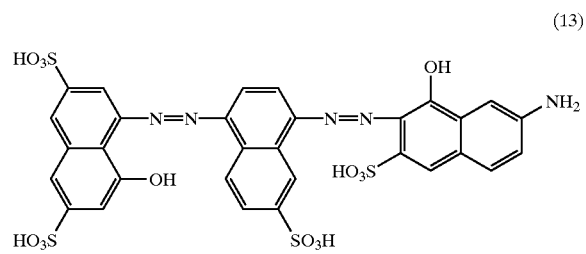

8.0 Parts of the compound of formula (13) thus prepared were dissolved in 100 parts of hot water, to which 0.83 part of sodium nitrite was added. The solution was added dropwise to 50 parts of 4.5% hydrochloric acid at 15 to 20° C. to diazotize. After 2.1 parts of 2,4-diaminobenzene-sulfonic acid was added to the suspension of the resultant diazo compound (13) at the same temperature, the reaction suspension was neutralized with an aqueous sodium carbonate solution over about 1 hour until the pH was 6.5. After the neutralization, it was stirred at 10 to 15° C. for 3 hours and at 15 to 20° C. for 3 hour while keeping the pH of 7 to 8 to complete the coupling reaction. After concentrated hydrochloric acid was added until pH was strongly acidic, the thus-precipitated dye was isolated by filtration and washed with water to remove inorganic salts. Then, the wet cake of the dye was suspended in 500 ml of water and the resultant dye paste was neutralized with 70 ml of a 5N lithium hydroxide solution. The thus-prepared dye solution was spray-dried to obtain 8.7 parts of the lithium salt of the black trisazo compound (Compound No. 0027). Absorption spectrum of this salt in water was λ max=604 nm.

Example 7

Coupling was effected under the same condition as that described in Example 6 except that 2,4-diaminobenzenesulfonic acid was replaced with 1.2 parts of resorcin to obtain 8.2 parts of the black trisazo compound (Compound No. 0025). Absorption spectrum of this compound in water was λ max=606 nm.

Example 8

A solution prepared by dissolving 66.4 parts of the compound of formula (14) in 500 parts of water under a weak alkaline condition and then adding 10.3 parts of sodium nitrite was added dropwise to 400 parts of 4.5% hydrochloric acid at 5 to 10° C. to diazotize.

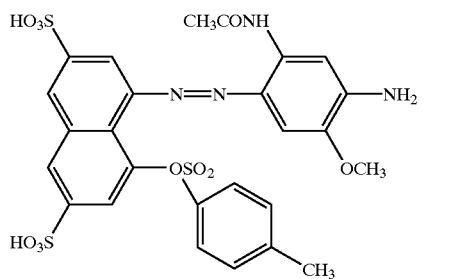

(14)

The suspension of the resultant diazo compound of formula (14) was added dropwise to an aqueous solution of 22.9 parts of 7-amino-1-hydroxynaphthalene-3-sulfonic acid dissolved in 500 parts of water at 0 to 5° C. over about 30 minutes. During this addition, the pH of the coupling was kept to be 8.5 to 9.5 by adding an aqueous sodium carbonate solution. After the addition, the reaction mixture was stirred at 5 to 10° C. for 3 hours and at 15 to 20° C. for 3 hours while keeping the pH of 8.5 to 9.0 to complete the coupling reaction. After a sodium hydroxide solution was added until the pH was 11 to 12, the reaction mixture was stirred at 70 to 75° C. for about 4 hours. Then, the solution was allowed to be cooled to room temperature and neutralized with concentrated hydrochloric acid until the pH was 6 to 7, to which sodium chloride was added to salt out. Precipitates were isolated by filtration and dried to obtain 69.5 parts of the compound of formula (15).

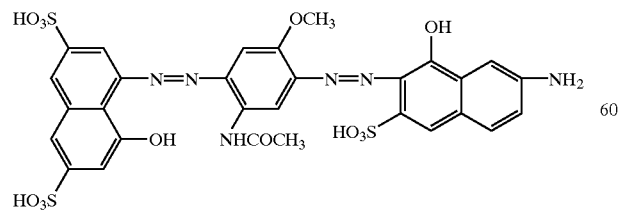

(15)

7.9 Parts of the compound of formula (15) thus prepared were dissolved in 100 parts of hot water, to which 0.83 part of sodium nitrite was added. The solution was added dropwise to 50 parts of 4.5% hydrochloric acid at 10 to 15° C. to diazotize. After 2.1 parts of 2,4-diaminobenzene-sulfonic acid was added to the suspension of the resultant diazo of the compound (15) at the same temperature, the reaction suspension was neutralized with a sodium carbonate solution over about 1 hour until the pH was 6.5. After the neutralization, it was stirred at 10 to 15° C. for 3 hours and at 15 to 20° C. for 3 hour while keeping the pH of 7 to 8 to complete the coupling reaction. Concentrated hydrochloric acid was added until the pH was 1.0, to which sodium chloride was added to salt out. The thus-precipitated dye was isolated by filtration and dried to obtain 8.9 parts of the black trisazo compound (Compound No. 0014). Absorption spectrum of this compound in water was λ max=590 nm.

Example 9

The black trisazo compound (Compound No. 0014) obtained in Example 8 was heated in 80 parts of an aqueous 10% hydrochloric acid solution at 80 to 90° C. for 6 hours to obtain 6.5 parts of the black trisazo compound (Compound No. 0048). Absorption spectrum of this compound in water was λ max=620 nm.

Example 10

The compound of formula (15) obtained in Example 8 was diazotized under the same condition as that described in Example 8. After adding 1.2 parts of 3-aminophenol to the suspension of the resultant diazonium salt, the reaction suspension was neutralized with a sodium carbonate solution over about 1 hour until the pH was 6.5. After the neutralization, it was stirred at 10 to 15° C. for 3 hours and at 15 to 20° C. for 3 hours while keeping the pH of 7 to 8 to complete the coupling reaction, to which sodium chloride was added to salt out. The thus-precipitated dye was isolated by filtration and dried to obtain 7.9 parts of the black trisazo compound (Compound No. 0011). Absorption spectrum of this compound in water was λ max=596 nm.

Example 11

Coupling was effected under the same condition as that described in Example 8 except that 2,4-diaminobenzenesulfonic acid was replaced with 1.2 parts of resorcin to obtain 8.2 parts of the black trisazo compound (Compound No. 0012). Absorption spectrum of this compound in water was λ max=602 nm.

Example 12

A solution prepared by dissolving 70.8 parts of the compound of formula (16) in 500 parts of water under a weak alkaline condition and then adding 10.3 parts of sodium nitrite was added dropwise to 400 parts of 4.5% hydrochloric acid at 5 to 10° C. to diazotize.

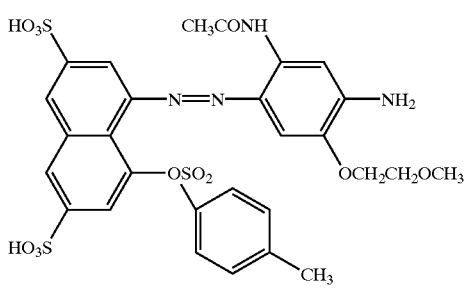

(16)

The suspension of the resultant diazo compound (16) was added dropwise to an aqueous solution of 22.9 parts of 7-amino-1-hydroxynaphthalene-3-sulfonic acid dissolved in 500 parts of water at 0 to 5° C. over about 30 minutes. During this addition, the pH of the coupling was kept to be 8.5 to 9.5 by adding an aqueous sodium carbonate solution. After the addition, the reaction mixture was stirred at 5 to 10° C. for 3 hours and at 15 to 20° C. for 3 hours while keeping the pH of 8.5 to 9.0 to complete the coupling reaction. After a sodium hydroxide solution was added until the pH was 11 to 12, the reaction mixture was stirred at 70 to 75° C. for about 4 hours. Then, the solution was allowed to be cooled to room temperature and neutralized with concentrated hydrochloric acid until the pH was 6 to 7, to which sodium chloride was added to salt out. Precipitates were isolated by filtration and dried to obtain 72.3 parts of the compound of formula (17).

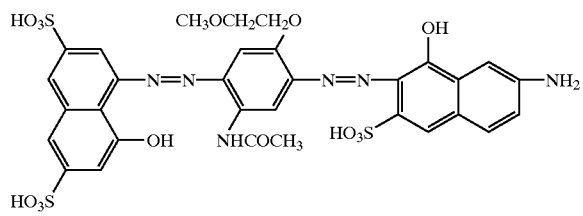

(17)

8.0 Parts of the compound of formula (17) thus prepared were dissolved in 100 parts of hot water, to which 0.83 part of sodium nitrite was added. The solution was added dropwise to 50 parts of 4.5% hydrochloric acid at 10 to 15° C. to diazotize. After 2.1 parts of 2,4-diaminobenzene-sulfonic acid was added to the suspension of the resultant diazo compound (17) at the same temperature, the reaction suspension was neutralized with a sodium carbonate solution over about 1 hour until the pH was 6.5. After the neutralization, it was stirred at 10 to 15° C. for 3 hours and at 15 to 20° C. for 3 hour while keeping the pH of 7 to 8 to complete the coupling reaction. After concentrated hydrochloric acid was added until the pH was 1.0, sodium chloride was added to salt out. The thus-precipitated dye was isolated by filtration and dried to obtain 8.9 parts of the black trisazo compound (Compound No. 0022). Absorption spectrum of this compound in water was λ max=591 nm.

Example 13

8.0 Parts of the black trisazo compound (Compound No. 0022) obtained in Example 12 was heated in 80 parts of an aqueous 10% hydrochloric acid solution at 80 to 90° C. for 6 hours to obtain 7.0 parts of the black trisazo compound (Compound No. 0051). Absorption spectrum of this compound in water was λ max=620 nm.

Example 14

Coupling was effected under the same condition as that described in Example 12 except that 2,4-diaminobenzenesulfonic acid was replaced with 1.2 parts of 3-aminophenol to obtain 8.0 parts of the black trisazo compound (Compound No. 0020). Absorption spectrum of this compound in water was λ max=598 nm.

Example 15

Coupling was effected under the same condition as that described in Example 12 except that 3-aminophenol was replaced with 1.1 parts of m-phenylenediamine to obtain 7.9 parts of the black trisazo compound (Compound No. 0019). Absorption spectrum of this compound in water was λ max=596 nm.

Example 16

A solution prepared by dissolving 66.4 parts of the compound of formula (14) in 500 parts of water under a weak alkaline condition and then adding 10.3 parts of sodium nitrite was added dropwise to 400 parts of 4.5% hydrochloric acid at 10 to 15° C. to diazotize. The suspension of the resultant diazo compound (14) was added dropwise to an aqueous solution of 31.9 parts of 7-amino-1-hydroxynaphthalene-3,6-disulfonic acid dissolved in 500 parts of water at 5 to 10° C. over about 1 hour. During this addition, the pH was kept to be 8.5 to 9.5 by adding an aqueous sodium carbonate solution. After the addition, the reaction mixture was stirred at 10 to 15° C. for 3 hours and at 20 to 25° C. for 3 hours while keeping the pH of 9.0 to 9.5 to complete the coupling reaction. After a sodium hydroxide solution was added until the pH was 11 to 12, the reaction was stirred at 70 to 75° C. for about 4 hours. Then, the solution was allowed to be cooled to room temperature and neutralized with concentrated hydrochloric acid until the pH was 4 to 5, to which sodium chloride was added to salt out. Precipitates were isolated by filtration and dried to obtain 73.8 parts of the compound of formula (18).

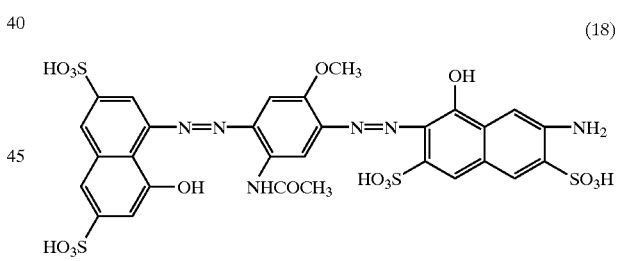

(18)

8.4 Parts of the compound of formula (18) thus prepared were dissolved in 100 parts of hot water, to which 0.83 part of sodium nitrite was added. The solution was then added dropwise to 50 parts of 4.5% hydrochloric acid at 20 to 25° C. to diazotize. After 2.1 parts of 2,4-diaminobenzene-sulfonic acid was added to the suspension of the resultant diazo compound (18) at the same temperature, the reaction suspension was neutralized with a sodium carbonate solution over about 1 hour until the pH was 6.5. After the neutralization, it was stirred at 20 to 25° C. for 5 hours while keeping the pH of 7 to 8 to complete the coupling reaction. After concentrated hydrochloric acid until the pH was 4.0, sodium chloride was added to salt out. The thus-precipitated dye was isolated by filtration and dried to obtain 9.2 parts of the black trisazo compound (Compound No. 0234). Absorption spectrum of this compound in water was λ max=605 nm.

Example 17

The compound of formula (18) obtained in Example 16 was diazotized under the same condition as that described in Example 16 to diazotize. After adding 1.2 parts of 3-aminophenol, the suspension of the resultant diazonium salt was neutralized with a sodium carbonate solution over about 1 hour until the pH was 6.5. After the neutralization, it was stirred at 20 to 25° C. for 5 hours while keeping the pH of 7 to 8 to complete the coupling reaction. Then, sodium chloride was added to salt out. The thus-precipitated dye was isolated by filtration and dried to obtain 7.9 parts of the black trisazo compound (Compound No. 0231). Absorption spectrum of this compound in water was $\lambda$ max=606 nm.

Example 18

Coupling was effected under the same condition as that described in Example 16 except that 2,4-diaminobenzenesulfonic acid was replaced with 1.2 parts of resorcin to obtain 8.2 parts of the black trisazo compound (Compound No. 0232). Absorption spectrum of this compound in water was $\lambda$ max=608 nm.

Example 19

The black trisazo compound (Compound No. 0231) obtained in Example 17 was heated in 80 parts of an aqueous 10% hydrochloric acid solution at 80 to 90° C. for 6 hours to obtain 6.5 parts of the black trisazo compound (Compound No. 0264). Absorption spectrum of this compound in water was $\lambda$ max=624 nm.

Example 20

(A) Preparation of Ink

A liquid having the following formulation was prepared and passed through a 0.45 $\mu$m membrane filter to obtain an aqueous ink composition for ink jet printers.

| (formulation) | parts |
|---|---|
| trisazo compound obtained in each of Examples 1 to 19 (used after desalting) | 3.0 |
| water | 67.0 |
| ethylene glycol | 5.0 |
| glycerol | 5.0 |
| N-methylpyrrolidone | 7.0 |
| urea | 10.0 |
| IPA | 3.0 |

(B) Ink Jet Printing

An ink jet recording was conducted on three different papers, i.e. plain papers (Canon printer paper A4 (TLB5A4S)), ink jet papers A (Color BJ Paper LC 101; ex. Canon) and ink jet papers B (coated papers for ink jet printer STX73 A4; ex. Sharp) by means of an ink jet printer (trade name NOVA JET III; ex. ENCAD). The thus-recorded images were tested with respect to the resistances to light and water and a color rendering property.

(C) Test for Resistance to Light of the Recorded Images

The recorded images were irradiated with light for 20 hours by means of a carbon arc fade meter (ex. SUGA Shikenkisha). Light fastness was judged according to the Blue Scale for light resistance standard as defined in JIS L-0841.

(D) Test for Resistance to Water of the Recorded Images

Test specimen was immersed in water contained in a beaker with mild stirring for 2 minutes and dried. Amount of the compound was observed by the visual examination before and after the immersion, and dropout of the compound was judged.

○ Less amount of the compound was dropped out.

Δ About half of the compound was dropped out.

X Large amount of the compound was dropped out.

(E) Color Rendering Property

Discoloration was judged by the visual examination by comparing the hue change under the tungsten light with that under the standard light source.

○ Change in hue was small.

Δ Change in hue was somewhat large.

X Change in hue was large.

Comparative Examples 1 and 2

Two types of dyes, one being used as black dye for ink jet printers and other being proposed as black dye for ink jet printers were tested by way of comparative examples.

(1) Comparative Example 1

An ink was prepared from C.I. Food Black 2 in the same manner as that described in the aforementioned (A) and (B) and used for ink jet printing.

(2) Comparative Example 2

An ink was prepared from the dye represented by the formula (19) in the same manner as that described in the aforementioned (A) and (B) and used for ink jet printing.

(19)

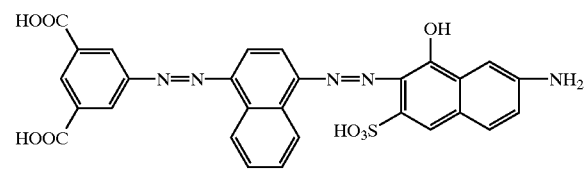

The results are shown in Table 28.

TABLE 28

| Com-pound No. | light fastness (rank) | | | water fastness | | | color rendering property |
|---|---|---|---|---|---|---|---|
| | plain paper | ink jet paper A | ink jet paper B | plain paper | ink jet paper A | ink jet paper B | |
| 0001 | 5 | 4–5 | 5 | Δ~○ | ○ | ○ | ○ |
| 0002 | 4–5 | 4 | 5 | Δ~○ | ○ | ○ | ○ |
| 0003 | 4–5 | 3–4 | 4–5 | Δ | ○ | ○ | ○ |
| 0005 | 5 | 4–5 | 5 | Δ~○ | ○ | ○ | ○ |
| 0007 | 4 | 3–4 | 4 | ○ | ○ | ○ | ○ |
| 0011 | 4–5 | 4 | 4 | Δ~○ | ○ | ○ | ○ |
| 0012 | 4–5 | 3–4 | 4 | Δ | ○ | ○ | ○ |
| 0014 | 5 | 5 | 5 | Δ | ○ | ○ | ○ |
| 0019 | 5 | 5 | 5 | Δ~○ | ○ | ○ | ○ |
| 0020 | 4–5 | 4 | 5 | Δ~○ | ○ | ○ | ○ |
| 0022 | 5 | 5 | 5 | Δ~○ | ○ | ○ | ○ |
| 0025 | 4–5 | 3 | 4 | x~Δ | ○ | ○ | ○ |
| 0027 | 5 | 4 | 5 | x~Δ | ○ | ○ | ○ |
| 0048 | 4–5 | 4 | 5 | ○ | ○ | ○ | ○ |
| 0051 | 4–5 | 4 | 5 | ○ | ○ | ○ | ○ |
| 0231 | 4–5 | 4 | 5 | Δ | ○ | ○ | ○ |
| 0232 | 4 | 4 | 4 | Δ~○ | ○ | ○ | ○ |

TABLE 28-continued

| Com-<br>pound<br>No. | light fastness (rank) | | | water fastness | | | color<br>rendering<br>property |
|---|---|---|---|---|---|---|---|
| | plain<br>paper | ink jet<br>paper A | ink jet<br>paper B | plain<br>paper | ink jet<br>paper A | ink jet<br>paper B | |
| 0234 | 5 | 5 | 5 | Δ | ○ | ○ | ○ |
| 0264 | 4–5 | 4 | 5 | ○ | ○ | ○ | ○ |
| Comp. Ex. 1 | 4–5 | 3 | 4–5 | x | ○ | x | Δ |
| Comp. Ex. 2 | 4 | 2 | 4 | ○ | ○ | ○ | x |

As shown in Table 28, the ink composition containing the compound of the present invention shows the water resistance equal to or higher than that of each of the prior black dyes (comparative examples), excellent light resistance and color rendering property, especially very excellent in light resistance on ink jet papers, and the balanced water and light resistances. And, it was found that the recording fluid is excellent in storage stability and ejecting stability since the ink composition of the present invention has a high water solubility.

Effect of the Invention

The recording liquid containing the trisazo compound of the present invention is used for ink jet printing and as writing utensils. When printed on plain papers and ink jet papers, recorded images having high optical density can be formed. It has excellent light and water resistances and good storage stability as a recording liquid.

What is claimed is:

1. A trisazo compound or a salt thereof, wherein said compound is represented by the following general formula (1):

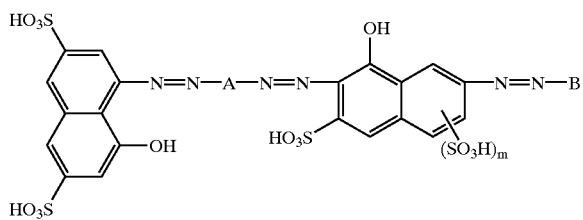

(1)

wherein

A is a group of the general formula (2) or (3):

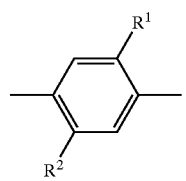

(2)

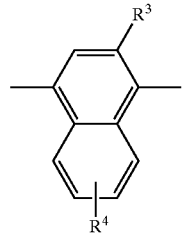

(3)

wherein $R^1$ and $R^2$ are each independently amino, sulfo, (C1–C2)alkyl, (C1–C2)alkoxy, or (C2–C4) alkanoylamino, $R^3$ is hydrogen or (C1–C2)alkoxy, and $R^4$ is hydrogen or sulfo;

B is a group represented by the general formula (4):

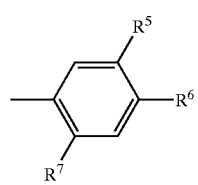

(4)

wherein $R^5$, $R^6$ and $R^7$ are each independently hydrogen, hydroxyl, amino, carboxyl, (C1–C2) alkoxy, (C1–C2)alkylamino optionally substituted with hydroxy, (C2–C3)alkanoylamino or sulfo; and m is 0 or 1.

2. A salt of a trisazo compound as claimed in claim 1 which is a lithium salt, a sodium salt, or an ammonium salt represented by the general formula (5):

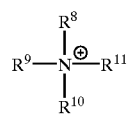

(5)

wherein $R^8$ to $R^{11}$ are each independently hydrogen, (C1–C4)alkyl, or hydroxy-(C2–C4)alkyl.

3. A trisazo compound or its salt as claimed in claim 1 wherein A is the group of the general formula (2) wherein $R^1$ and $R^2$ each independently methyl, ethyl, methoxy, ethoxy, amino, sulfo, acetylamino or n-propionylamino or the general formula (3) wherein $R^3$ is hydrogen or methoxy and $R^4$ is hydrogen or sulfo.

4. A trisazo compound or its salt as claimed in claim 1 wherein A is the group of the general formula (2) wherein $R^1$ is methyl or methoxy, and $R^2$ is methyl, methoxy, amino, or acetylamino.

5. A trisazo compound or its salt as claimed in claim 1 wherein B is the group of the general formula (4) wherein $R^5$ is hydrogen, methoxy, carboxyl or sulfo, and $R^6$ and $R^7$ are each independently hydroxyl, amino, or acetylamino.

6. A trisazo compound or its salt as claimed in claim 1 wherein m is zero.

7. An aqueous ink composition containing a trisazo compound or its salt as defined in claim 1.

8. A colored article, colored with a trisazo compound as defined in claim 1 or an aqueous ink composition as defined in claim 7.

9. A colored article as claimed in claim 8 wherein coloring is effected by means of a printer.

* * * * *